United States Patent [19]
Reed et al.

[11] 3,866,109
[45] Feb. 11, 1975

[54] DIGITAL COMPUTER CONTROL SYSTEM AND METHOD FOR MONITORING AND CONTROLLING OPERATION OF INDUSTRIAL GAS TURBINE APPARATUS EMPLOYING EXPANDED PARAMETRIC CONTROL ALGORITHM

[75] Inventors: Terry J. Reed, Latrobe; John F. Reuther, Pittsburgh, both of Pa.

[73] Assignee: Westinghouse Electric Corporation, Pittsburgh, Pa.

[22] Filed: Jan. 26, 1973

[21] Appl. No.: 326,718

Related U.S. Application Data

[63] Continuation of Ser. No. 189,633, Oct. 15, 1971.

[52] U.S. Cl. .................... 322/15, 290/40, 60/39.28, 235/151.21
[51] Int. Cl. ............................................. F01d 21/14
[58] Field of Search ................. 290/52, 2, 40, 40.2; 322/14, 15, 23, 33, 34, 53, 59; 235/151.21; 60/39.14, 39.23

[56] References Cited
UNITED STATES PATENTS

| | | |
|---|---|---|
| 3,382,672 | 5/1968 | French .............................. 60/39.28 |
| 3,435,326 | 5/1969 | Zechlin ................................. 322/25 |
| 3,446,224 | 5/1969 | Zwicky ................................. 137/26 |
| 3,469,395 | 9/1969 | Spitzbergen et al. .............. 60/39.28 |
| 3,482,396 | 12/1969 | Nelson et al. ...................... 60/39.28 |
| 3,588,265 | 6/1971 | Berry ..................................... 290/40 |
| 3,606,754 | 9/1971 | White ................................. 60/39.14 |

*Primary Examiner*—G. R. Simmons
*Attorney, Agent, or Firm*—S. A. Seinberg

[57] ABSTRACT

A hybrid digital computer gas turbine power plant control system which may operate in a multiple control loop arrangement is provided with a plurality of process sensors at various operating cycle positions. Derivative inputs provide a basis for responsive control system variation of gas turbine parameters. Parametric control is maintained over generator and turbine subsystems during all modes of operations. More specifically, optimally arranged system thermocouples provide inputs from which temperature control variables are derived. Inlet guide vanes are positioned in response thereto to control exhaust gas temperatures while maintaining near optimum generator output.

19 Claims, 35 Drawing Figures

PATENTED FEB 11 1975 3,866,109

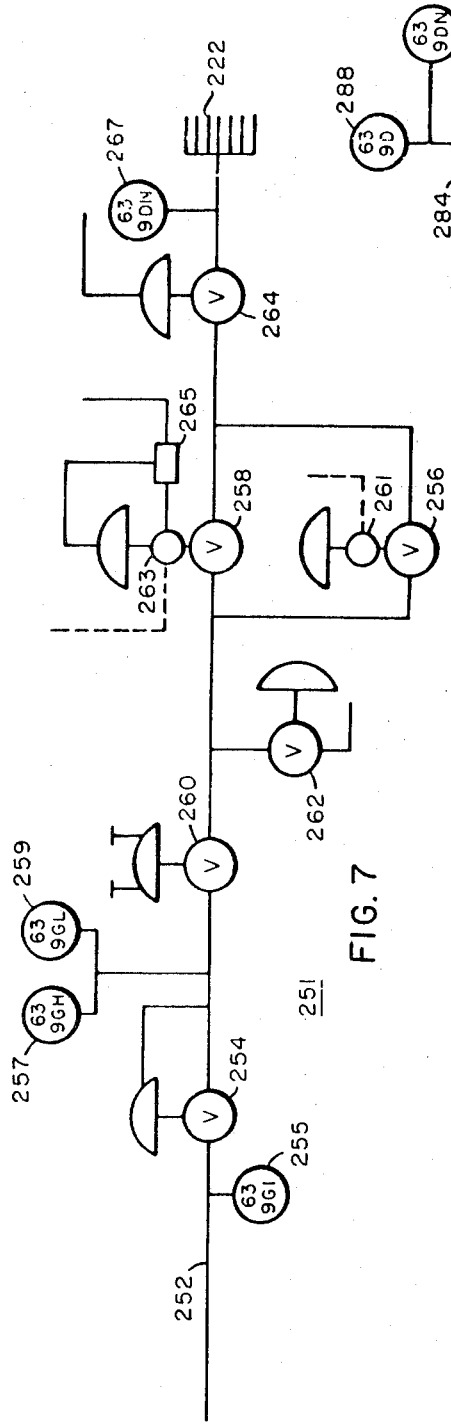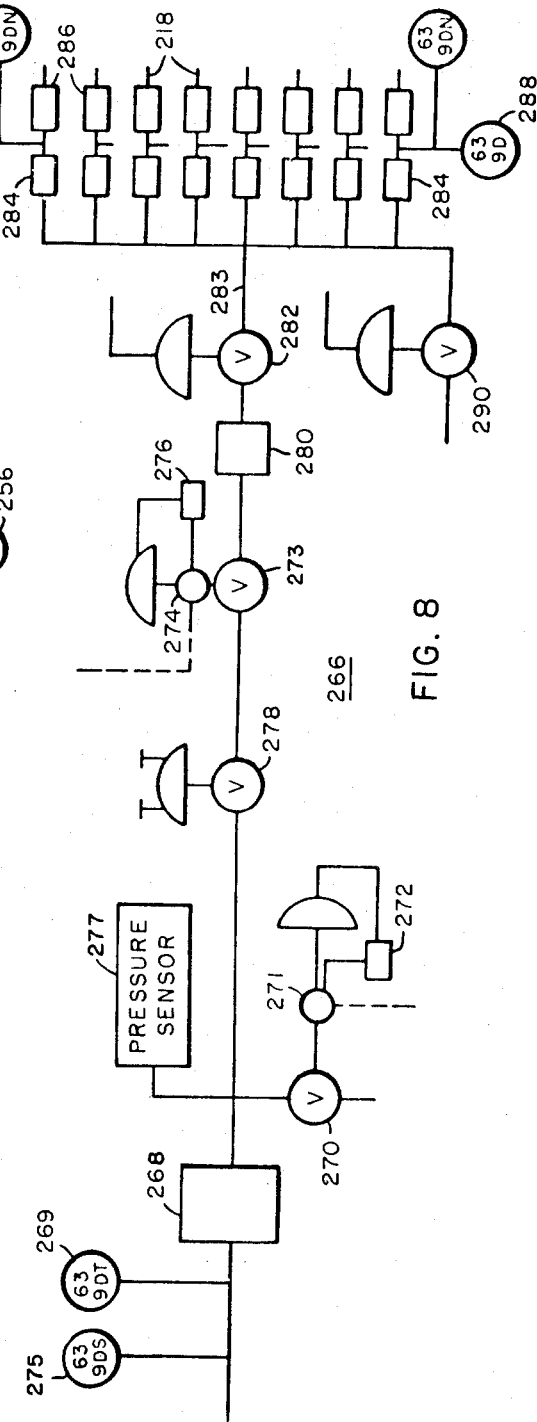
FIG. 7
FIG. 8

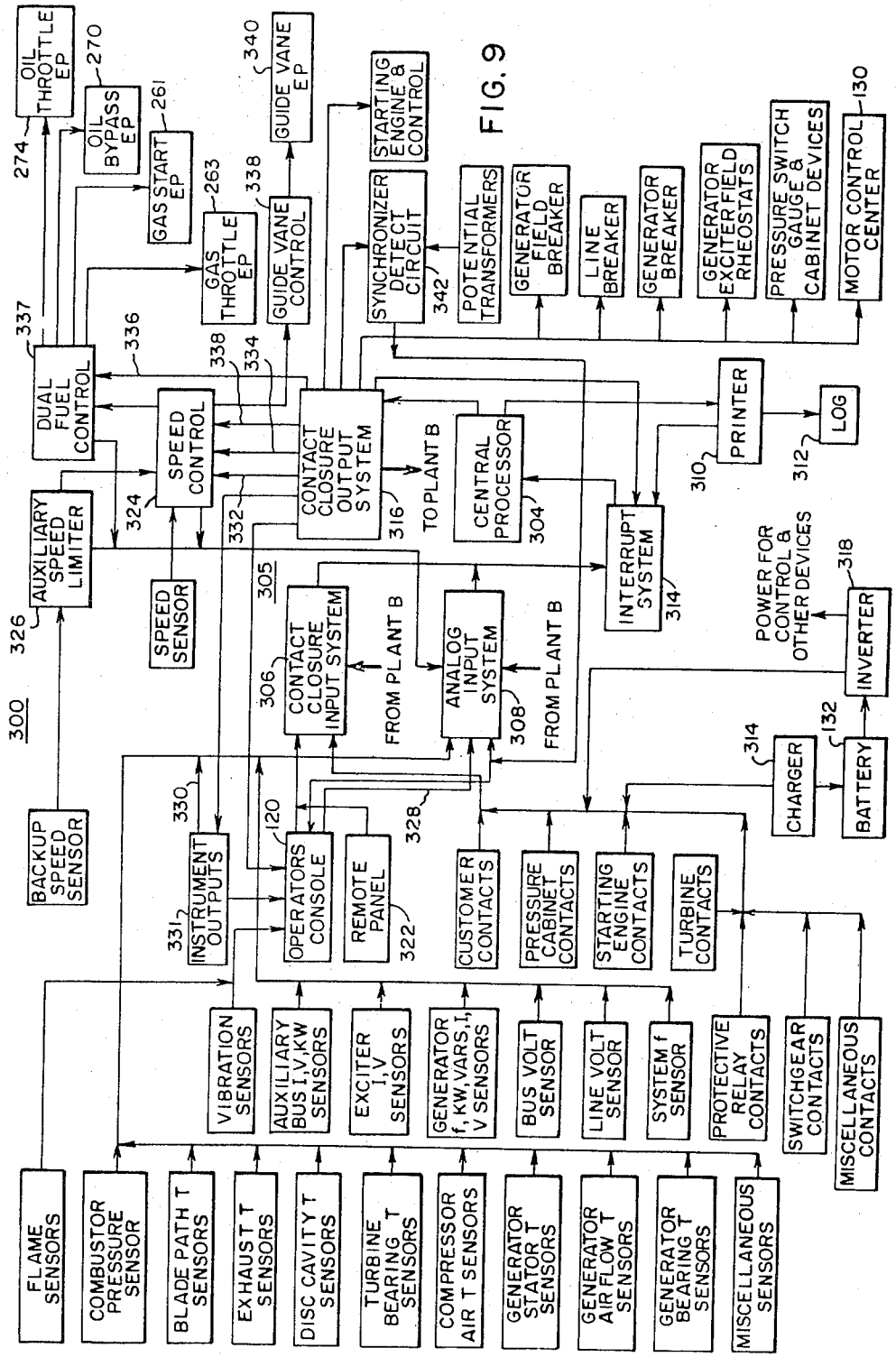

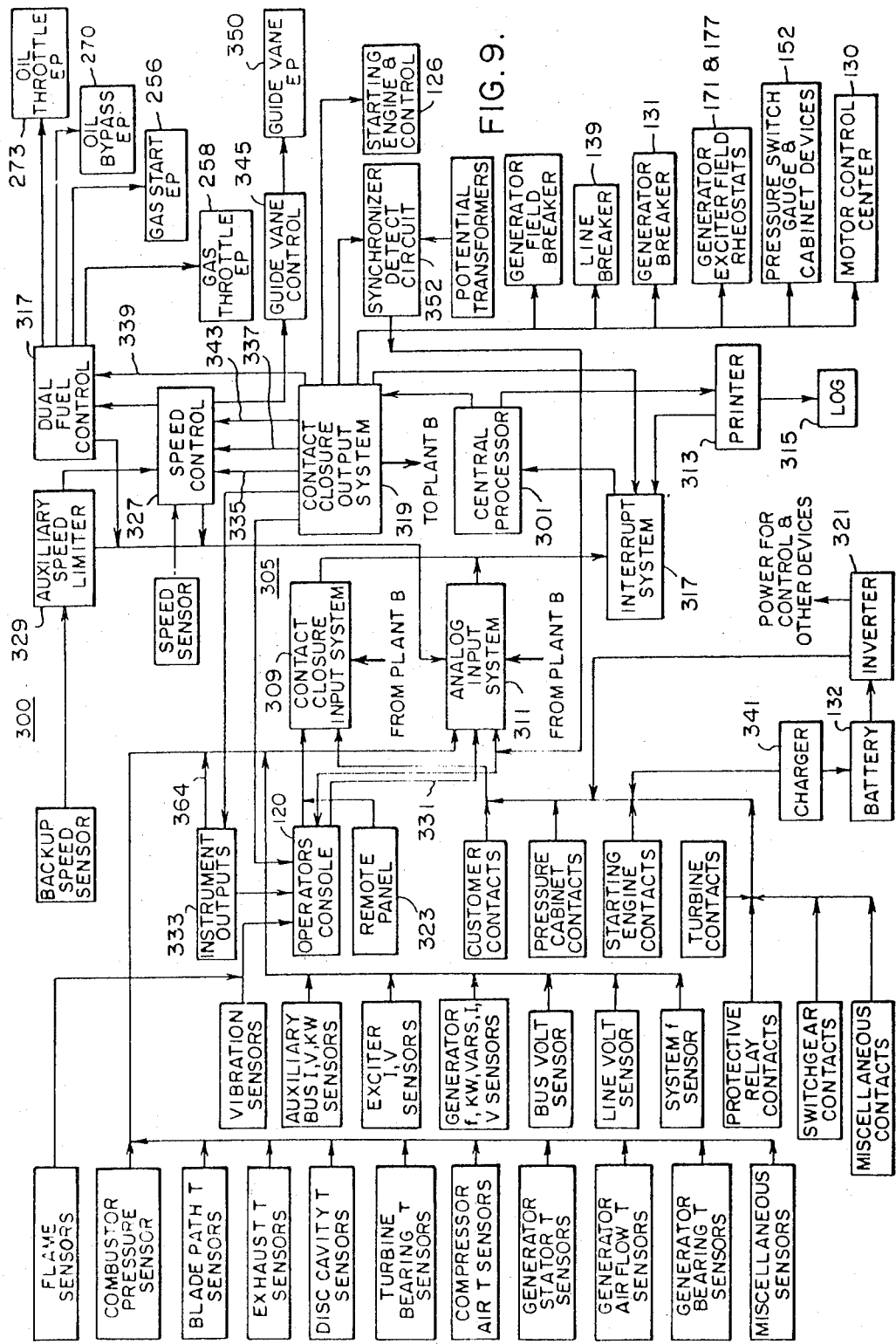

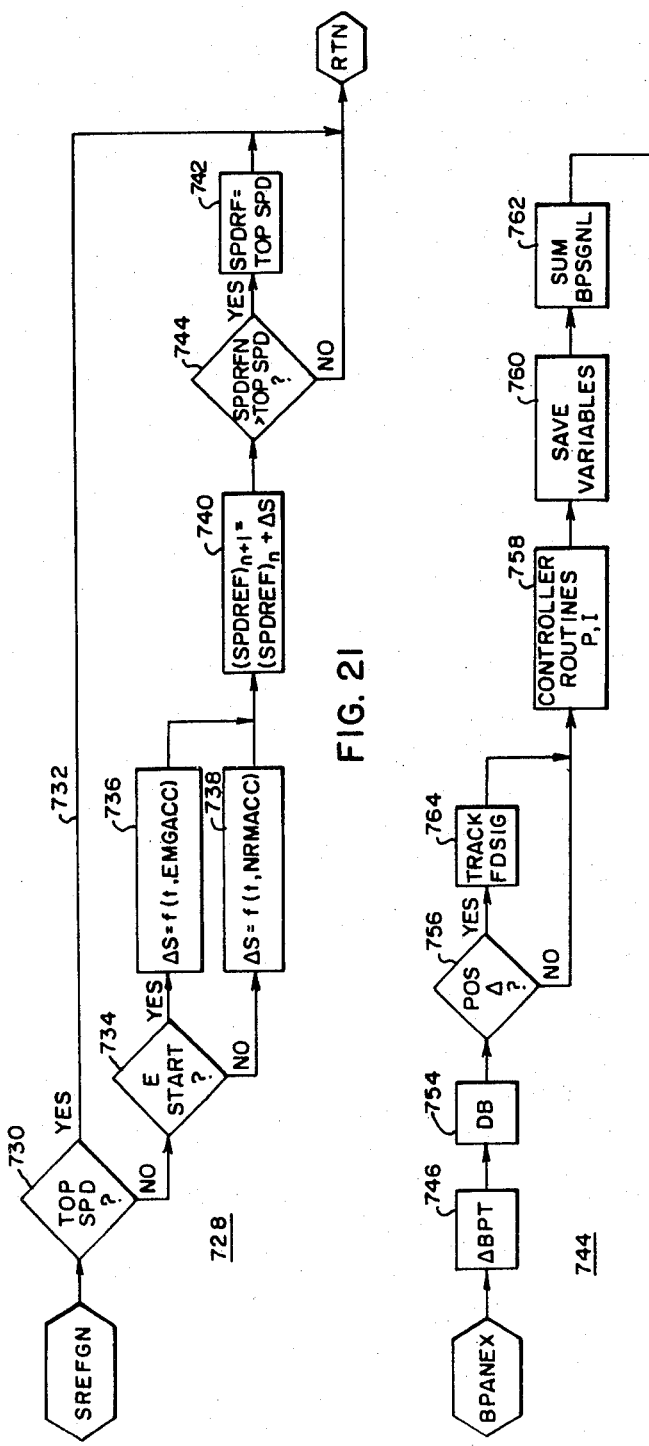
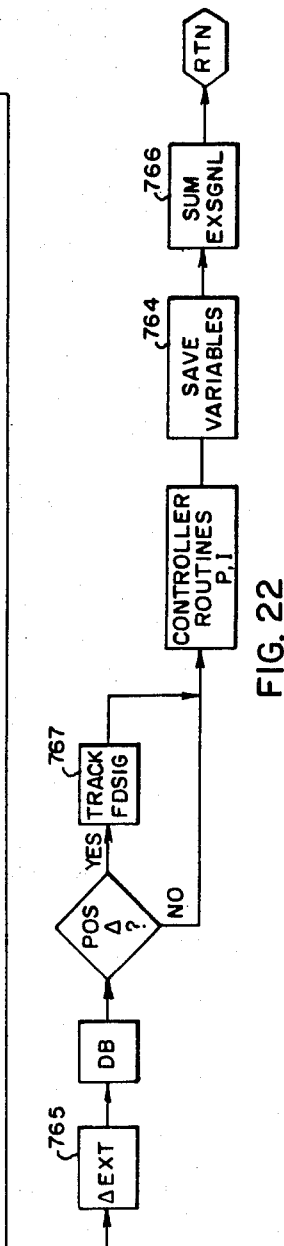
FIG. 21
FIG. 22

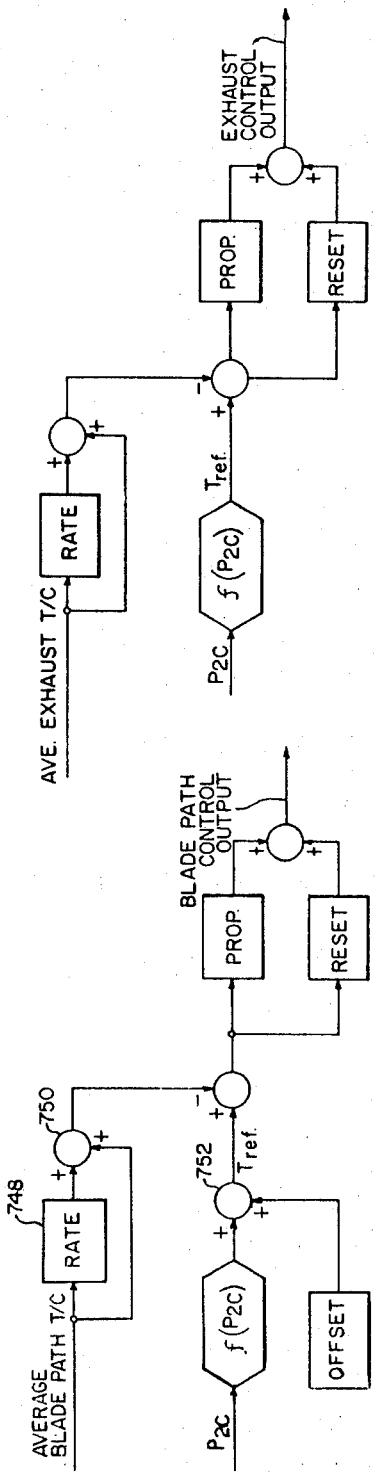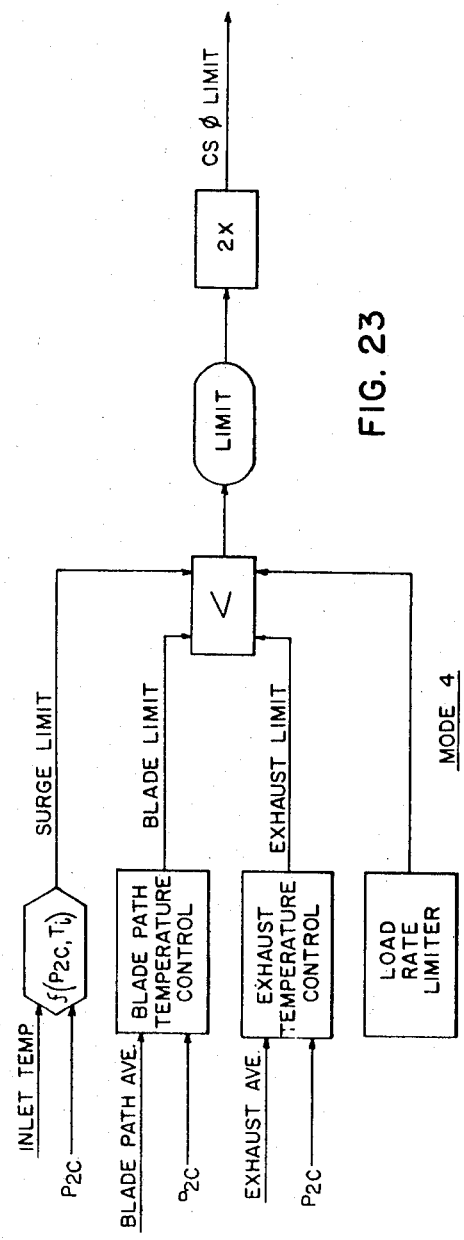
FIG. 24B
FIG. 24A
FIG. 23

3,866,109

DIGITAL COMPUTER CONTROL SYSTEM AND METHOD FOR MONITORING AND CONTROLLING OPERATION OF INDUSTRIAL GAS TURBINE APPARATUS EMPLOYING EXPANDED PARAMETRIC CONTROL ALGORITHM

This is a continuation of application Ser. No. 189,633, filed Oct. 15, 1971.

CROSS REFERENCE TO RELATED APPLICATIONS

Reference is hereby made to the following related applications, all of which are assigned to the present assignee:

U.S. Pat. application Ser. No. 82,470, filed on Oct. 20, 1970 in the names of J. Reuther and T. Giras, entitled "System And Method For Operating Industrial Gas Turbine Apparatus And Gas Turbine Electric Power Plants Preferably With A Digital Computer Control System," now abandoned in favor of U.S. Pat. application Ser. No. 319,114, filed on Dec. 29, 1972 as a streamline continuation thereof;

U.S. Pat. application Ser. No. 82,469, filed on Oct. 20, 1970, in the names of R. Kiscaden and R. Yannone, entitled "System And Method For Accelerating And Sequencing Industrial Gas Turbine Apparatus And Gas Turbine Electric Power Plants Preferably With A Digital Computer Control System," now abandoned in favor of U.S. Pat. application Ser. No. 252,948, filed on May 12, 1972 as a streamline continuation thereof, and U.S. Pat. application Ser. No. 252,131, filed on May 10, 1972 as a divisional of the originally filed, above mentioned U.S. Pat. application Ser. No. 82,469;

U.S. Pat. application Ser. No. 82,467, filed on Oct. 20, 1970, in the name of T. Reed, entitled "Improved System And Method For Operating Industrial Turbine Apparatus And Gas Turbine Electric Power Plants Preferably With A Digital Computer Control System;"

U.S. Pat. application Ser. No. 205,263, filed on Dec. 6, 1971 in the name of J. Reuther, entitled "Industrial Gas Turbine Power Plant Control System Having Capability For Effecting Automatic Fuel Transfer Under Load Preferably Employing A Digital Computer," now abandoned in favor of U.S. Pat. application Ser. No. 308,892 filed on Nov. 22, 1972 as a streamline continuation thereof;

U.S. Pat. application Ser. No. 99,491, filed on Dec. 18, 1970 in the name of J. Reuther, entitled "System And Method Employing A Digital Computer For Automatically Synchronizing A Gas Turbine Or Other Electric Power Plant Generator With A Power System," now abandoned in favor of U.S. Pat. application Ser. No. 276,508, filed on July 31, 1972 as a streamline continuation thereof;

U.S. Pat. application Ser. No. 99,493, filed on Dec. 18, 1970 in the name of T. Reed, entitled "System And Method Employing A Digital Computer With Improved Programmed Operation For Automatically Synchronizing A Gas Turbine Or Other Electric Power Plant Generator With A Power System," now abandoned in favor of U.S. Pat. application Ser. No. 276,343, filed on July 31, 1972 as a streamline continuation thereof;

U.S. Pat. application Ser. No. 155,905 filed on June 23, 1971, in the names of R. Yannone and T. Reed, entitled "Improved System And Method For Monitoring And Controlling Operation of Industrial Gas Turbine Apparatus And Gas Turbine Electric Power Plants Preferably With A Digital Computer Control System," now abandoned in favor of U.S. Pat. application Ser. No. 317,839, filed on Dec. 26, 1972 as a streamline continuation thereof;

U.S. Pat. application Ser. No. 189,632, filed on Oct. 15, 1971 in the names of R. Yannone and R. Kiscaden, entitled "Improved Digital Computer Control System And Method For Monitoring And Controlling Operation Of Industrial Gas Turbine Apparatus To Drive Simultaneously An Electric Power Plant Generator And Provide Exhaust Gases To An Industrial Process," now abandoned in favor of U.S. Pat. application Ser. No. 323,593, filed on Jan. 15, 1973 as a streamline continuation thereof;

U.S. Pat. application Ser. No. 204,944, filed on Dec. 6, 1971 in the name of G. Rankin, entitled "Industrial Gas Turbine Power Plant Control System And Method For Implementing Improved Dual Fuel Scheduling Algorithm Permitting Automatic Fuel Transfer Under Load," now abandoned in favor of U.S. Pat. application Ser. No. 332,457, filed on Feb. 14, 1973, as a streamline continuation thereof; and U.S. Pat. application Ser. No. 205,261, filed on Dec. 6, 1971 in the names of R. Yannone and R. Kiscaden, entitled "Improved Control System And Method For Controlling Dual Fuel Operation Of Industrial Gas Turbine Power Plants Preferably Employing A Digital Computer," now abandoned in favor of U.S. Pat. application Ser. No. 310,520, filed on Nov. 29, 1972 as a streamline continuation thereof.

BACKGROUND OF THE INVENTION

The present invention relates to gas or combustion turbine apparatus, gas turbine electric power plants and control systems and operating methods therefor.

Industrial gas turbines may have varied cycle, structural and aerodynamic designs for a wide variety of uses. For example, gas turbines may employ the simple, regenerative, steam injection or combined cycle in driving an electric generator to produce electric power. Further, in these varied uses, the gas turbine may have one or more shafts and many other rotor, casing, support, and combustion system structural features which can vary relatively widely among differently designed units. They may be aviation jet engines adapted for industrial service as described for example in an ASME paper entitled "The Pratt and Whitney Aircraft Jet Powered 121MW Electrical Peaking Unit" presented at the New York Meeting in November-December, 1964.

Gas turbine elecrtric power plants are usable in base load, mid-range load and peak load power system applications. Combined cycle plants are normally usable for the base or midrange applications while the power plant which employs a gas turbine only as a generator drive typically is highly useful for peak load generation because of its relatively low investment cost. Although the heat rate for gas turbines is relatively high in relation to steam turbines, the investment savings for peak load application typically offsets the higher fuel cost factor. Another economic advantage for gas turbines is that power generation capacity can be added in relatively small blocks, such as 25MW or 50MW, as needed for expected system growth thereby avoiding excessive capital expenditure and excessive system reserve requirements. Further background on peaking generation can be obtained in articles such as "Peaking Generation," a Special Report of Electric Light and Power, dated Nov. 1966.

Startup availability and low forced outage rates are particularly important for peak load power plant applications of gas turbines. Thus, reliable gas turbine startup and standby operations are particularly important for power system security and reliability.

Other gas turbine uses include drive applications for pipeline or process industry compressors and surface transportation units. An additional application of gas turbines is that which involves recovery of turbine exhaust heat energy in other apparatus such as electric power or industrial boilers or other heat transfer apparatus. More generally, the gas turbine air flow path may form a part of an overall process system in which the gas turbine is used as an energy source in the flow path.

In many applications, it is desired to furnish a continuous regulated flow of discharged gases at a constant temperature. In certain applications of industrial gas turbines, it is sought to derive energy to drive a generator to produce electric power while simultaneously recovering constant temperature exhaust gases for an industrial process. Increasing emphasis on dual or multiple uses of one or more operatively associated gas turbines has been projected owing to the obvious economic advantages associated therewith.

In the operation of gas turbine apparatus and electric power plants, various kinds of controls have been employed. Relay-pneumatic type systems form a large part of the prior art. More recently, electronic controls of the analog types have been employed, as perhaps represented by U.S. Pat. No. 3,520,133 entitled Gas Turbine Control System and issued on July 14, 1970 to A. Loft or by the control referred to in an article entitled Speedtronic Control, Protection and Sequential System and designated as GER-2461 in the General Electric Gas Turbine Reference Library. A wide variety of controls have been employed for aviation jet engines including electronic and computer controls as described for example in a March, 1968 ASME Paper presented by J. E. Bayati and R. M. Frazzini and entitled "Digatec (Digital Gas Turbine Engine Control)," an April, 1967 paper in the Journal of the Royal Aeronautical Society authored by E. S. Eccles and entitled "The Use Of A Digital Computer For On-Line Control Of A Jet Engine," or a July, 1965 paper entitled "The Electronic Control Of Gas Turbine Engines" by A. Sadler, S. Tweedy and P. J. Colburn in the July 1965 Journal of the Royal Aeronautical Society. However, the operational and control environment for jet engine operation differs considerably from that for industrial gas turbines. In referencing prior art publications or patents as background herein, no representation is made that the cited subject matter is the best prior art.

In connection with prior art gas turbine electric power plant operating and control systems and operating methods therefor, reference is made to copending related application Ser. No. 82,470 which, in conjunction with other enumerated related patent applications, comprises a description of an improved gas turbine plant operating and control system. The present disclosure represents a further advancement over the prior art discussion herein contained and should be considered as exclusive of the referenced application. Generally, the operation of industrial gas turbine apparatus and gas turbine power plants have been limited in flexibility, response speed, accuracy and reliability. Further limits have been in the depth of operational control and in the efficiency or economy with which single or multiple units are placed under operational control and management. Such limitations have been particularly apparent in applications wherein reliable, flexible control and management is required to utilize efficiently and economically one or more industrial gas turbines in dual or multiple roles as hereinbefore described. Limits have existed on how close industrial gas turbines can operate to the individual turbine design limits over various ambient temperature ranges while simultaneously maintaining regulated air flow at constant exhaust temperature. Imposing load range constraints while maintaining operation at a constant exhaust temperature operating point has further limited utilization of gas turbines at or near design limits.

Generally, overall control loop arrangements and control system embodiments of such arrangements for industrial gas turbines have been less effective in operations control than is desirable. Critical temperature limit control has been less protective and less responsive to thermal transients than otherwise desirable.

More particularly, in gas turbine controls substantially simultaneous processing of inputs reflecting operating conditions of various turbine apparatus subsystems is essential. Optimum operation over a wide range of operating conditions can be assured only by continuous monitoring of turbine parameters and reliable accurate control loop response to variations in one or more of such parameters. A facility for rapidly determining control variable outputs to subsystem control apparatus as a function of joint variations in determined parameters is essential to attaining optimum operation.

Process sensors of various types have been employed to furnish control system inputs. Temperature sensors have been located at various turbine cycle positions and in varying configurations.

More specifically, accurate and reliable exhaust temperature indications have been increasingly recognized as essential in maintaining the integrity of a system having one or more control loops wherein it is sought to control turbine speed or load in response to a temperature derived fuel demand signal. During those modes of operation characterized principally by temperature control, the accuracy and reliability of such indications determines the degree to which optimum operating conditions may be attained. A description of an improved control system employing optimally arranged turbine system thermocouples, suitable for use in the gas turbine electric power plant of the present invention may be found in copending application Ser. No. 155,905.

Although reliable and accurate exhaust temperature control system inputs may be obtained and utilized for turbine fuel system operation, known prior art control systems have lacked a facility for maintaining a constant exhaust temperature near the optimum operating point for achieving maximum power system output. Known prior art control systems have lacked the flexibility requisite to the parametric consideration of a broad range of combinations of temperature and pressure inputs obtained from process sensors located at the various turbine cycle positions. Such control systems although responsive to variations in compressor inlet temperatures, combustor shell pressures, and turbine exhaust temperatures have lacked facility for directing a synergistic operation of subsystem control apparatus necessary to achieving constant exhaust temperature while operating the gas turbine subject to other constraints, for example, directing operation at or near optimum load.

Of considerable importance in a flexible gas turbine control system is a mechanism or algorithm for directing control actions for implementation by a particular subsystem control apparatus as a function of varying combinations of control parameters during different cycles of operation of the gas turbine. Particular emphasis is placed on such facility in dual or multiple role applications of industrial gas turbines, as previously outlined. Of particular importance is a capability for controlling alternatively as a function of turbine acceleration or speed during startup operation and subsequently altering subsystem operation as a function of ambient inlet temperatures, combustion cycle position temperatures, exhaust cycle position temperatures or generator load. Here again, known prior art turbine control systems have been severely limited in the range of parametric controls operative over different cycles of gas turbine operation.

Of particular significance in applications of industrial gas turbines wherein discharge exhaust gases are desirably maintained at a constant temperature or constrained to a small range of temperatures is a capability to modulate air flow into the compressor inlet under full load conditions. It is generally the case that modulated air flow is a requirement during earlier operation cycles when subsystem control is advantageously directed in response to sensed turbine speed.

Various air flow modulating means and control systems therefor have been utilized in earlier prior art gas turbine control systems. Cumbersome arrangements of louvers or dampers have been interposed between air inlets and combustion cycle positions. Steady-state exhaust temperatures have been maintained through manual adjustment in response to changing ambient temperatures. As readily appreciated, such systems lack the characteristics of responsiveness and flexibility required in the control environments enumerated previously.

Later control systems have employed variable guide vanes, manipulated in response to variations in one or more turbine parameters. Such control systems have lacked sufficient transient response. Further such systems have lacked the flexibility requisite to controlling the positioning of the guide vanes as a function of varying combinations of turbine control variables over different operating cycles. More specifically, guide vane positioning control algorithms of known art turbine control systems have been inadequate to achieving continuously responsive guide vane control as a function of temperature control variables. Such control systems have lacked the flexibility requisite to achieving continuously responsive positioning control over substantially all gas turbine operating cycles.

SUMMARY OF THE INVENTION

One or more industrial gas turbines or gas turbine generator power plants are operated by a control system which preferably employs a programmed digital computer in a hybrid control system arrangement. The control system operates in a gas turbine control loop arrangement preferably to achieve continuous control over the turbine and generator or other load unit over all modes of gas turbine operation. In power plant applications, the preferred computer monitors gas turbine and generator parameters and schedules synergistic operation of the two as a unit.

More specifically as regards expanded parametric scheduling or limit control, process temperature sensors are arranged and located at various gas turbine operation cycle positions to provide continuously available control system inputs. Means are provided for automatic review of such inputs and for deriving parametric control variables as a function of such inputs in combination with an input representative of generator load. Continuously responsive control of gas turbine and generator subsystems is thereby maintained. In a preferred implementation movable compressor air flow modulating means are manipuated in response to a signal representative of such control variables to vary turbine and generator parameters, specifically exhaust gas temperature and generator load.

BRIEF DESCRIPTION OF THE DRAWINGS

FIG. 7 and 8 respectively show schematic diagrams of gas and liquid fuel supply systems employed with the gas turbine of FIG. 3A.

FIG. 9 shows a block diagram of a digital computer control system employed to operate the gas turbine power plant of FIG. 1;

FIG. 21 shows a more detailed flowchart for a speed reference generation function included in the program of FIG. 20;

FIG. 22 shows a more detailed flowchart for a gas turbine blade path and exhaust temperature limit function employed in the program of FIG. 26;

FIG. 23 shows the control configuration of software elements associated with Mode 4 operations;

FIGS. 24A-B respectively show software control configurations for the blade path temperature and exhaust temperature limit functions;

DESCRIPTION OF THE PREFERRED EMBODIMENT

A. POWER PLANT

1. General Structure

Figure 1:
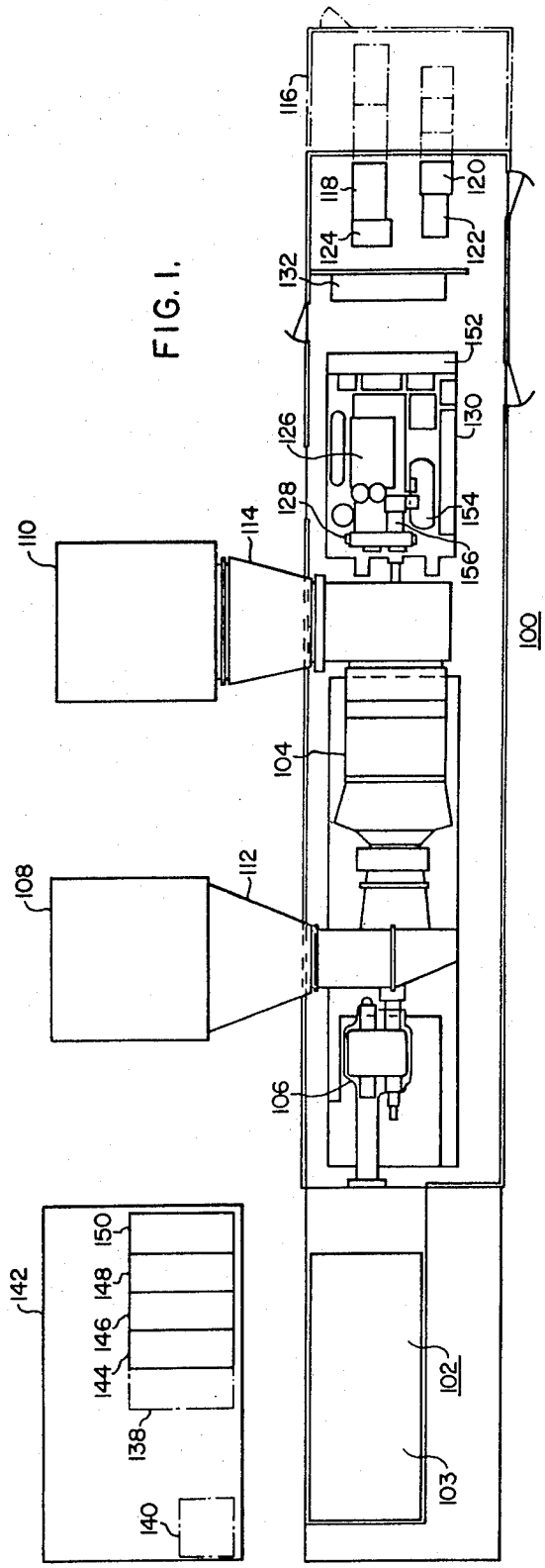
FIG. 1 shows a top plan view of a gas turbine power plant arranged to operate in accordance with the prinnciples of the invention.

More particularly, there is shown in FIG. 1, a gas turbine electric power plant 100 which includes an AC generator 102 driven by a combustion or gas turbine 104 through a reduction gear unit 106. In this application of the invention, the gas turbine 104 is the W-251G simple cycle type manufactured by Westinghouse Electric Corporation. In other power plant generator applications, other industrial drive applications, and combined steam and gas cycle applications of various aspects of the invention, industrial gas turbines having larger or smaller power ratings, different cycle designs, diffent number of shafts or otherwise different from W-251G can be employed.

The plant 100 may be housed in an enclosure (not shown) and then placed on a foundation approximately 106 to 115 feet long dependent upon the number of optional additional plant units to be accommodated thereon. Up to three additional units may be provided. Exhaust silencers 108 and 110 coupled respectively to inlet and exhaust duct works 112 and 114 significantly reduce noise characteristics associated with turbine power plants.

Digital computer and other control systems circuitry in a cabinet 118 provides for operation of the power plant 100 when a single plant unit is selected by the user. Associated therewith is an operator's panel 120, an automatic send/receive printer 122 and a protective relay panel 124 for sensing abnormal electric power system conditions. The number of basic master and slave units 118 through 124 provided may vary according to the number of plants being monitored and controlled.

Startup or cranking power for the plant 100 is provided by a starting engine 126 such as a diesel engine. Starting engine 126 is mounted on an auxiliary bedplate and coupled to the drive shaft of the gas turbine 104 through a starting gear unit 128. A DC motor 154 operates through a turning gear 156 which is also coupled to the gas turbine shaft starting gear 128 to drive the gas turbine at turning gear speed.

A motor control center 130 is also mounted on the auxiliary bedplate and it includes motor starts and other devices to provide for operating the various auxiliary equipment items associated with the plant 100.

A plant battery 132 is disposed adjacent to one end of the auxiliary bedplate or skid. The battery provides power for emergency lighting, auxiliary motor loads, and DC computer and other control power for a period following shutdown of the plant 100 due to a loss of AC power. Also included on the auxiliary skid is pressure switch and gauge cabinet 152 which contains the pressure switches, gauges, regulators and other miscellaneous elements needed for gas turbine operation.

A switchgear pad 142 is included in the plant 100 for 15 KV switchgear including the generator breaker as indicated by the reference characters 144, 146 and 148. Excitation switchgear 150 associated with the generator excitation system is also included on the switchgear pad 142.

2. Generator and Exciter

Figure 2:
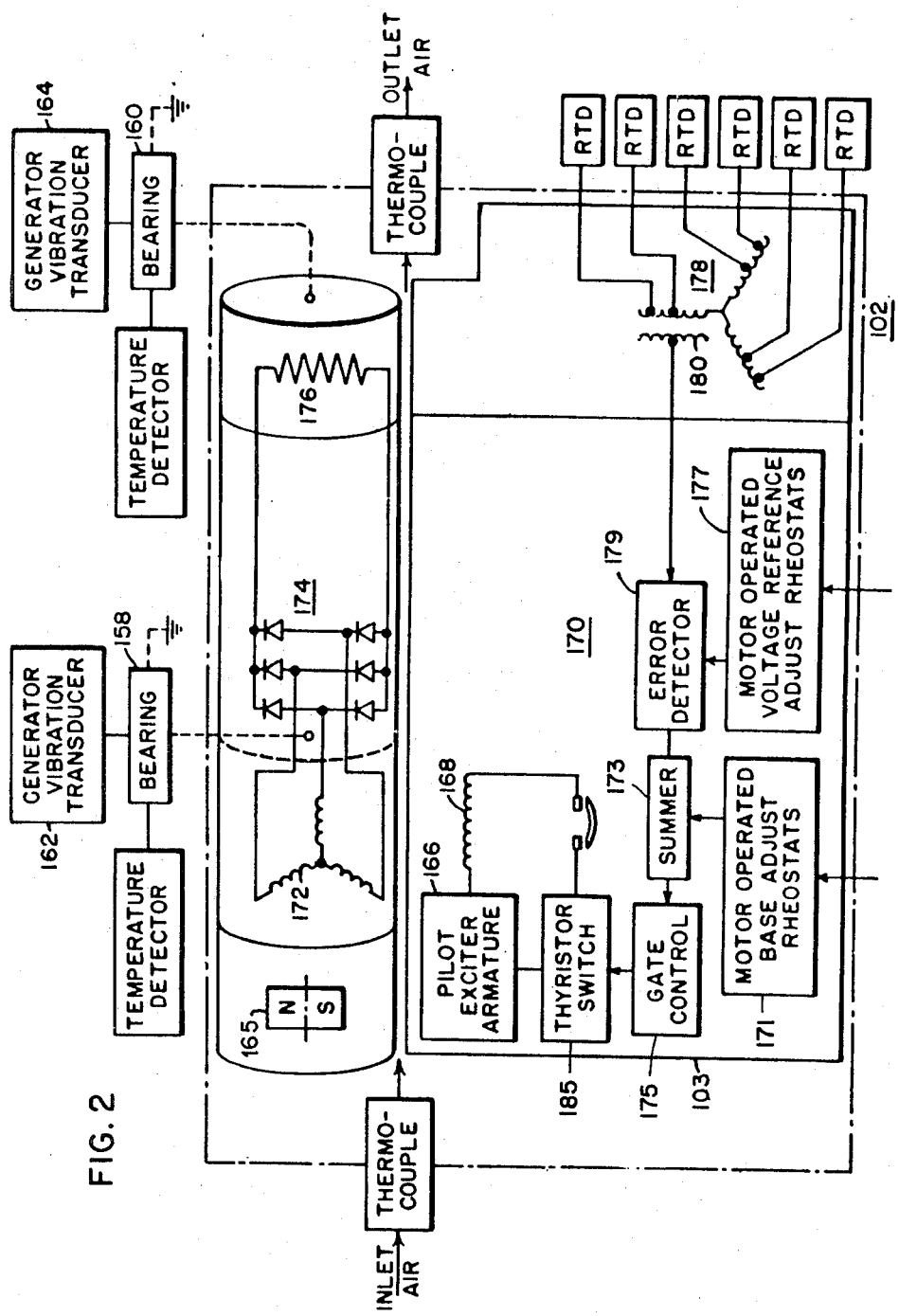
FIG. 2 shows a schematic view of a rotating rectifier exciter and a generator employed in the gas turbine power plant of FIG. 1.

The generator 102 and its brushless exciter 103 are schematically illustrated in greater detail in FIG. 2. Structural details as well as details of operation are considered more fully in the aforementioned copending application Ser. No. 82,470, Section A2, pages 21 to 24.

Briefly, a permanent magnet field member 165 is rotated to induce voltage in a pilot exciter armature 166 which is coupled to a stationary AC exciter field 168 through a voltage regulator 170. Voltage is thereby induced in an AC exciter armature 172 formed on the exciter rotating element and it is applied across diodes mounted with fuses on a diode wheel 174 to energize a rotating field element 176 of the generator 102. Generator voltage is induced in a stationary armature winding 178 which supplies current to the power system through a generator breaker when the plant 100 is synchronized and on the line. A transformer 180 supplies a feedback signal for the regulator 170 to control the excitation level of the exciter field 168.

Various monitoring devices to be hereinafter more fully described are provided which generate input data for the plant control system. Included are vibration transducers 162 and 164 resistant temperature detectors embedded in the stator winding and thermocouples installed to measure air inlet discharge temperature and bearing oil drain temperatures. In this manner alarm conditions are provided to the control system. Additional control functions are provided to adjust base adjust rheostats 171 and 177 to provide fine generator voltage control.

3. Gas Turbine a. Compressor

Figure 3A:
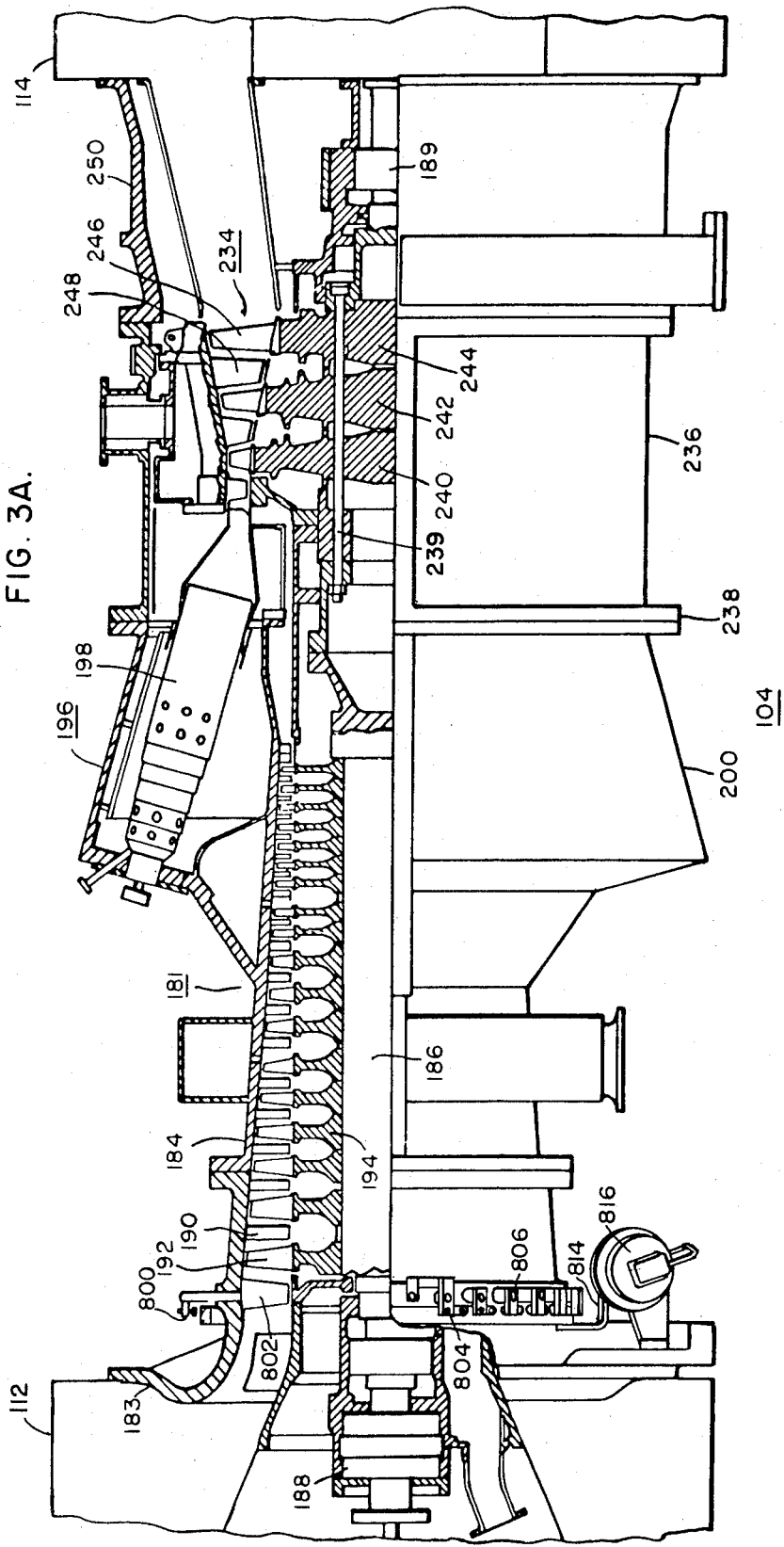
FIG. 3A shows a front elevational view of an industrial gas turbine employed in the power plant to drive the generator and it is shown with some portions thereof broken away.
Figure 3B:
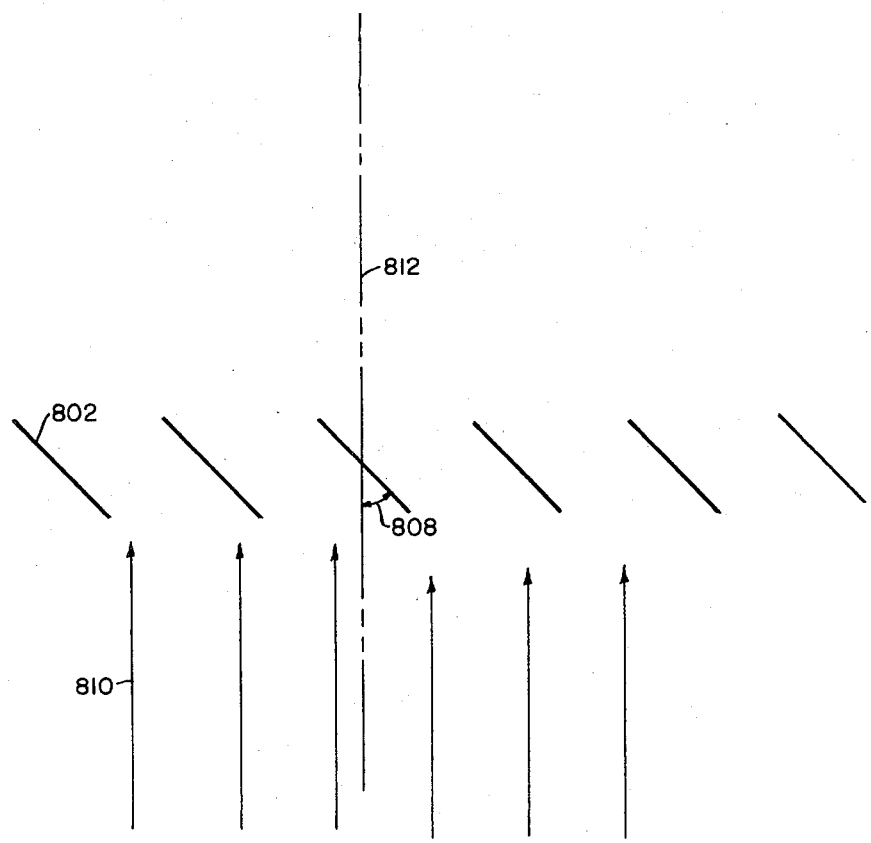
FIG. 3B shows a schematic representation of the variable inlet guide vanes demonstrating their uniform positioning relative to the incoming air flow.

The gas turbine 104 in this case is the single shaft, simple cycle type having a standard ambient pressure ratio of 9.0 to 1 and a rated speed of 4,894 rpm and it is illustrated in greater detail in FIG. 3A. Filtered inlet air enters a multistage axial flow compressor 181 through a flanged inlet manifold 183 from the inlet ductwork 112. An inlet guide vane assembly 800 includes rotatably mounted variable inlet guide vanes 802 circumferentially spaced about the compressor inlet. The vanes 802 are mechanically coupled to a pneumatically operated positioning ring 804 by a plurality of link assemblies 806. As shown in FIG. 3B, the angle 808 at which the guide vanes 802 are disposed in relation to the air stream is uniform, having been positioned in response to the synchronous uniform movement of the link assemblies 806 occasioned by angular displacement of the positioning ring 804. Rotations of the positioning ring 804 are in response to a computer generated electrical signal which is transformed into a pneumatic signal by an inlet guide vane transducer (not shown). The pneumatic signal subsequently operates an inlet guide vane actuator piston contained in the air cylinder actuator 816, which delivers a force to an actuator bracket 814 sufficient to displace the positioning ring by the desired amount.

The direction of air flow into the compressor 181 indicatd by the arrows 810 may be considered, ideally, as generally parallel the longitudinal axis 812 of the gas turbine 104. Such flow is modulated by the guide vane 802 so that optimum temperatures and pressures may be maintained within the compressor and turbine stages.

The compressor 181 is provided with a casing 184 which is split into base and cover parts along a horizontal plane. The turbine casing structure including the compressor casing 184 provides support for a turbine rotating element including a compressor rotor 186 through bearings 188 and 189. Vibration transducers (FIG. 9) are provided for the gas turbine bearings 188 and 189.

The compressor casing 184 also supports stationary blades 190 in successive stationary blade rows along the air flow path. Further, the casing 184 operates as a pressure vessel to contain the air flow as it undergoes compression. Bleed flow is obtained under valve control from intermediate compressor stages to prevent surge during startup.

The compressor inlet air flows annularly through a total of eighteen stages in the compressor 181. Blade 192 mounted on the rotor 186 by means of wheels 194 are appropriately designed from an aerodynamic and structural standpoint for the intended service. A suitable material such as 12chrome steel is employed for the rotor blades 192. Both the compressor inlet and oulet air temperatures are measured by suitably supported thermocouples (FIG. 9).

b. Combustion System

Pressurized compressor outlet air is directed into a combustion system 196 comprising a total of eight combustor baskets 198 conically mounted within a section 200 of the casing 184 about the longitudinal axis of the gas turbine 104. Combustor shell pressure is detected by a suitable sensor (FIG. 9) coupled to the compressor-combustor flow paths located in the pressure switch and gauge cabinet 152.

Figure 4:
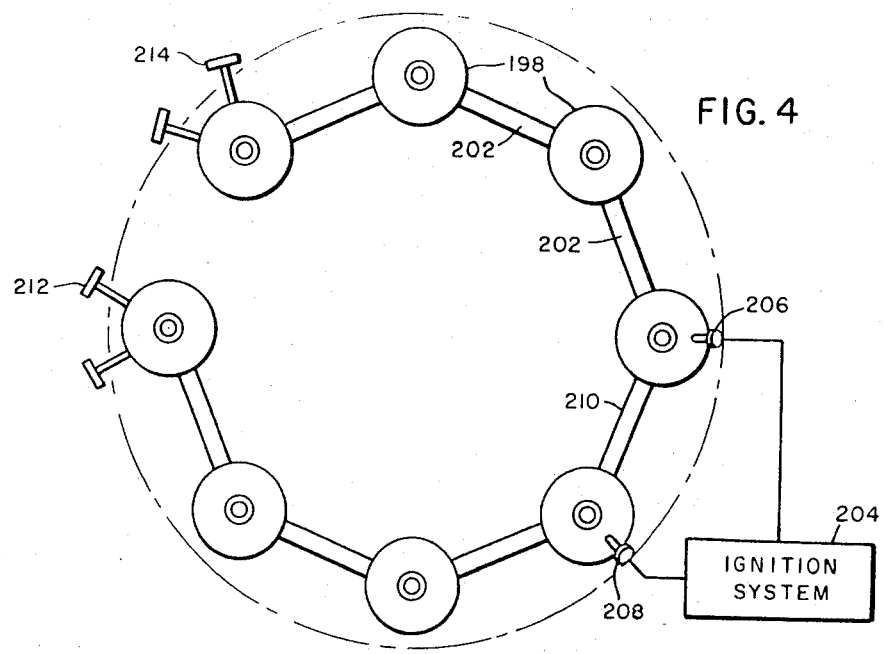
FIGS. 4–6 show a fuel nozzle and parts thereof employed in the gas turbine of FIG. 3A.

As schematically illustrated in FIG. 4, the combustor baskets 198 are cross-connected by cross-flame tubes 202 for ignition purposes. A computer sequenced ignition system 204 includes igniters 206 and 208 associated with respective groups of four combustor baskets 198. In each basket group, the combustor baskets 198 are series cross-connected and the two groups are cross-connected at one end only as indicated by the reference character 210.

Generally, the ignition system 204 includes an ignition transformer and wiring to respective spark plugs which form a part of the igniters 206 and 208. The spark plugs are mounted on retractable pistons within the igniters 206 and 208 so that the plugs can be withdrawn from the combustion zone after ignition has been executed.

A pair of ultraviolet flame detectors 212 and 214 are associated with each of the end combustor baskets in the respective basket groups in order to verify ignition and continued presence of combustion in the eight combustor baskets 198. The flame detectors 212 can for example be Edison flame detectors Model 424-10433.

Figures 5, 6:
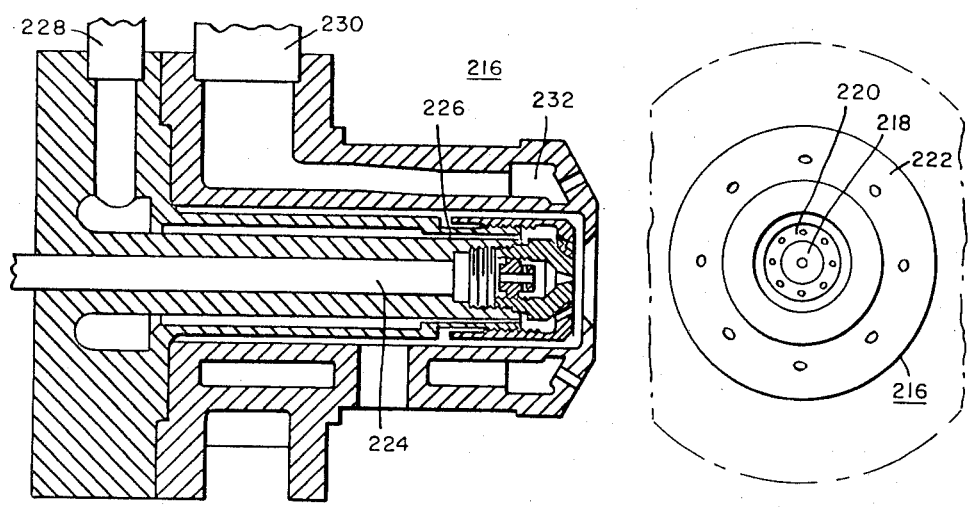

In FIG. 5, there is shown a front plan view of a dual fuel nozzle mounted at the compressor end of each combustor basket 198. An oil nozzle 218 is located at the center of the dual nozzle 216 and an atomizing air nozzle 220 is located circumferentially about the oil nozzle 218. An outer gas nozzle 222 is disposed about the atomizing air nozzle 220 to complete the assembly of the fuel nozzle 216.

As indicated in the broken away side view in FIG. 6, fuel oil or other liquid fuel enters the oil nozzle 218 through a pipe 224 while atomizing air for the fuel oil enters a manifold pipe arrangement 226 through entry pipe 228 for flow through the atomizing air nozzle 220. Gaseous fuel is emitted through the nozzle 222 after flow through entry pipe 230 and a manifold pipe arrangement 232.

c. Fuel

Generally, either liquid or gaseous or both liquid and gaseous fuel flow can be used in the turbine combustion process. Various gaseous fuels can be burned including gases ranging from blast furnace gas having low BTU content to gases with high BTU content such as natural gas, butane or propane.

With respect to liquid fuels, the fuel viscosity must be less than 100 SSU at the nozzle to assure proper atomization. Most distillates meet this requirement.

A portion of the compressor outlet air flow combines with the fuel in each combustor basket 198 to produce combustion after ignition and the balance of the compressor outlet air flow combines with the combustion products for flow through the combustor basket 198 into a multistage reaction type turbine 234 (FIG. 3). The combustor casing section 200 is coupled to a turbine casing 236 through a vertical casing joint 238. No high pressure air or oil seal is required between the compressor 181 and the turbine 234.

d. Turbine Element

The turbine 234 is provided with three reaction stages through which the multiple stream combustion system outlet gas flow is directed in an annular flow pattern to transform the kinetic energy of the heated, pressurized gas into turbine rotation, i.e., to drive the compressor 181 and the generator 102. The turbine rotor is formed by a stub shaft 239 and three disc blade assemblies 240, 242 and 244 mounted on the stub shaft by through bolts. Thermocouples (FIG. 9) are supported within the disc cavities to provide cavity temperature signals for the control system.

High temperature alloy rotor blades 246 are mounted on the discs in forming the disc assemblies 240, 242 and 244. Individual blade roots are cooled by air extracted from the outlet of the compressor 181 and passed through a coolant system in the manner previously indicated. The blade roots thus serve as a heat sink for the rotating blades 246. Cooling air also flows over each of the turbine discs to provide a relatively constant low metal temperature over the unit operating load range.

In addition to acting as a pressure containment vessel for the turbine 234, the turbine casing 236 supports stationary blades 248 which form three stationary blade rows interspersed with the rotor blade rows. Gas flow is discharged from the turbine 234 substantially at atmospheric pressure through a flanged exhaust manifold 250 to the outlet ductwork 114.

The generator and gas turbine vibration transducers (FIG. 9) can be conventional velocity transducers or pickups which transmit basic vibration signals to a vibration monitor for input to the control system. A pair of conventional speed detectors (FIGS. 9 and 13A) are associated with a notched magnetic wheel (FIG. 13A) supported at appropriate turbine-generator shaft locations. Signals generated by the speed detectors are employed in the control system in determining power plant operation.

Thermocouples (FIG. 9) are associated with the gas turbine bearing oil drains. Further, thermocouples (FIG. 9) for the blade path are supported about the inner periphery of the exhaust manifold 250 to provide a fast response indication of blade temperature for control system usage particularly during plant startup periods. Exhaust temperature detectors (FIG. 9) are disposed in the exhaust ductwork 114 primarily for the purpose of determining average exhaust temperature for control system usage during load operations of the power plant 100. Suitable high response shielded thermocouples for the gas turbine 104 are those which are compacted alumina insulation with a thin-wall high alloy swaged sheath or well supported by a separate heavy wall guide.

e. Fuel System

A fuel system 251 is provided for delivering gaseous fuel to the gas nozzles 222 under controlled fuel valve operation as schematically illustrated in FIG. 7. Gas is transmitted to a diaphragm operated pressure regulating valve 254 via line 252 from the plant gas source. A pressure switch 255 provides for transfer to oil fuel at a low gas pressure limit. Pressure switches 257 and 259 provide high and low pressure limit control action on the downstream side of the valve 254. It is noted at this point in the description that IEEE switchgear device numbers are generally used herein where appropriate as incorporated in American Standard C37.2-1956.

A starting valve 256 determines gas fuel flow to the nozzles 222 at turbine speeds up to approximately 10% rated flow, and for this purpose it is pneumatically positioned by an electropneumatic converter 261 in response to an electric control signal. At gas flow from 10% to 100% rated, a throttle valve 258 determines gas fuel flow to the nozzles 222 under the pneumatic positioning control of an electropneumatic converter 263 and a pneumatic pressure booster relay 265. The converter 263 also responds to an electric control signal as subsequently more fully considered.

A pneumatically operated trip valve 260 stops gas fuel flow under mechanical actuation if turbine overspeed reaches a predetermined level such as 110% rated speed. A pneumatically operated vent valve 262 allows trapped gas to be vented to the atmosphere if the trip valve 260 and an on/off pneumatically operated isolation valve 264 are both closed. The isolation valve fuel control action is initiated by an electric control signal applied through the pressure switch and gauge cabinet 152 (FIG. 1 and FIG. 9). A pressure switch 267 indicates fuel pressure at the inlet to the nozzles 222.

As schematically shown in FIG. 8, a liquid fuel supply system 266 provides for liquid fuel flow to the eight nozzles 218 from the plant source through piping and various pneumatically operated valves by means of the pumping action of a turbine shaft driven main fuel pump 268. Pump discharge pressure is sensed for control system use by a detector 277. A bypass valve 270 is pneumatically operated by an electropneumatic converter 271 and a booster relay 272 to determine liquid fuel bypass flow to a return line and thereby regulate liquid fuel discharge pressure. An electric control signal provides for pump discharge pressure control, and in particular it provides for ramp pump discharge pressure control during turbine startup. A throttle valve 273 is held at a minimum position during the ramp pressure control action on the discharge pressure regulator valve 270. A pressure switch 269 provides for DC backup pump operation on low pressure, and a pressure switch 275 indicates whether the pump 268 has pressurized intake flow.

After pressure ramping, the pneumatically operated throttle valve 273 is positioned to control liquid fuel flow to the nozzles 218 as determined by an electropneumatic converter 274 and a booster relay 276. An electric control signal determines the converter position control action for the throttle valve 273. The bypass valve 270 continues to operate to hold fuel discharge pressure constant.

As in the gas fuel system 251, a mechanically actuated and pneumatically operated overspeed trip valve 278 stops liquid fuel flow in the event of turbine overspeed. A suitable filter 280 is included in the liquid fuel flow path, and, as in the gas fuel system 251, an electrically actuated and pneumatically operated isolation valve 282 provides on/off control of liquid fuel to a liquid manifold 283.

Eight positive displacement pumps 284 are respectively disposed in the individual liquid fuel flow paths to the nozzles 218. The pumps 284 are mounted on a single shaft and they are driven by the oil flow from the manifold 283 to produce substantially equal nozzle fuel flows. Check valves 286 prevent back flow from the nozzles 218 and a pressure switch 288 indicates fuel pressure at the oil nozzles 218. Aa manifold drain valve 290 is pneumatically operated under electric signal control during turbine shutdown to drain any liquid fuel remaining in the manifold 283.

4. Plant Performance Characteristics

Details concerning plant performance characteristics are contained in the aforementioned related application Ser. No. 82,470 Section A4, pages 32 to 36.

B. POWER PLANT OPERATION AND CONTROL

1. Control System - General

The preferred embodiment of the integrated turbine generator control system 300 (FIG. 9) employs analog digital computer circuitry to provide sequenced start-stop plant operation, monitoring and alarm functions for plant protection which accurately, reliably and efficiently performs speed/load control during plant startup, running operation and shutdown. The plant control system 300 is characterized with centralized systems packaging having a single operator's panel and embracing elements disposed in the control cabinet 118, the pressure switch and gauge cabinet 152 and other elements included in the electric power plant 100 of FIG. 1. If multiple plants like the power plant 100 are to be operated, plural control cabinets may be required to provide the additional circuitry needed for the additional plant operations.

The control philosophy embodied in the control system 300 provides flexible operator/control system interfaces. Under automatic control, the power plant 100 can be operated under local operator control or it can be unattended and operated by direct wired remote or supervisory control.

2. Control Loop Arrangement — Characterization.

Figure 11:
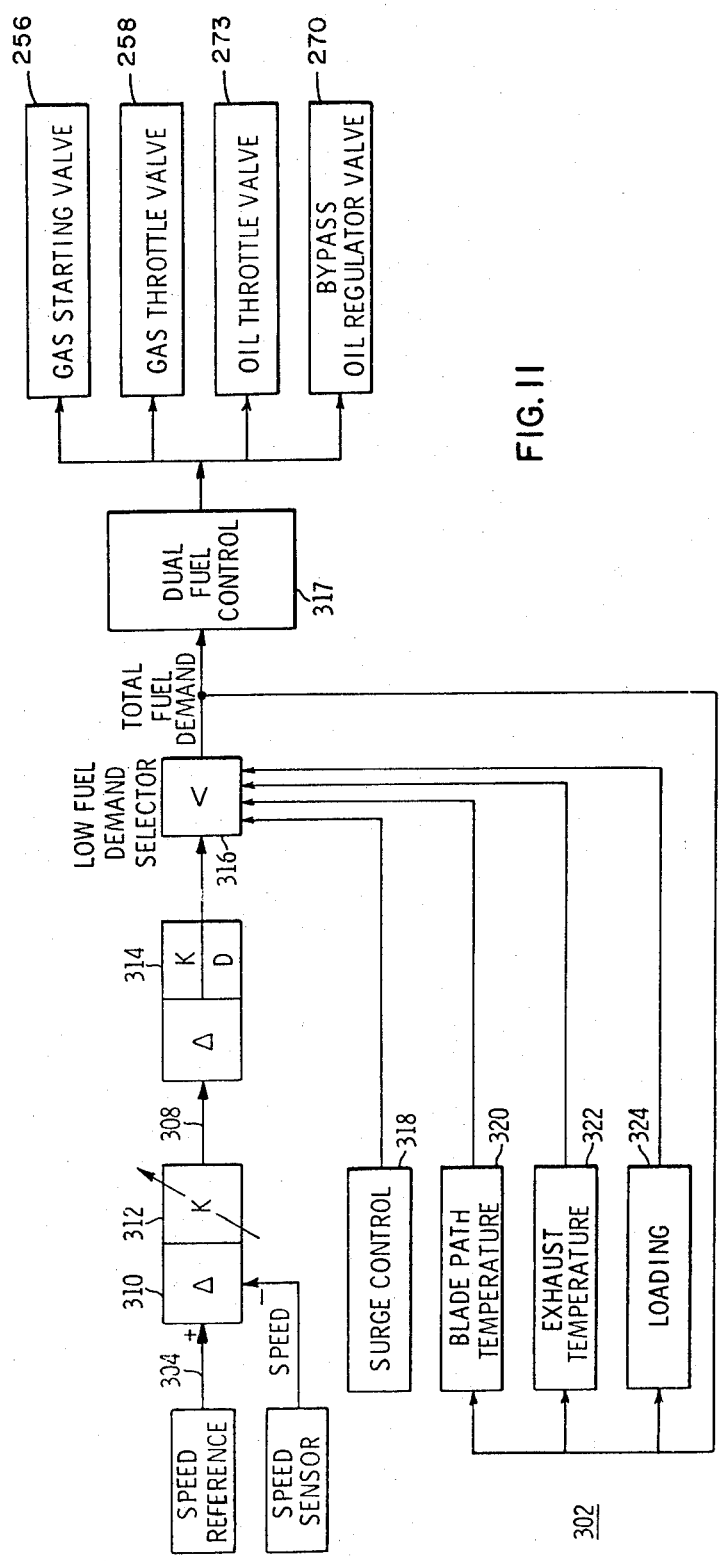
FIG. 11 shows a schematic diagram of a control loop which may be employed in operating the computer control system of FIG. 9 and the power plant of FIG. 1.
Figure 12:
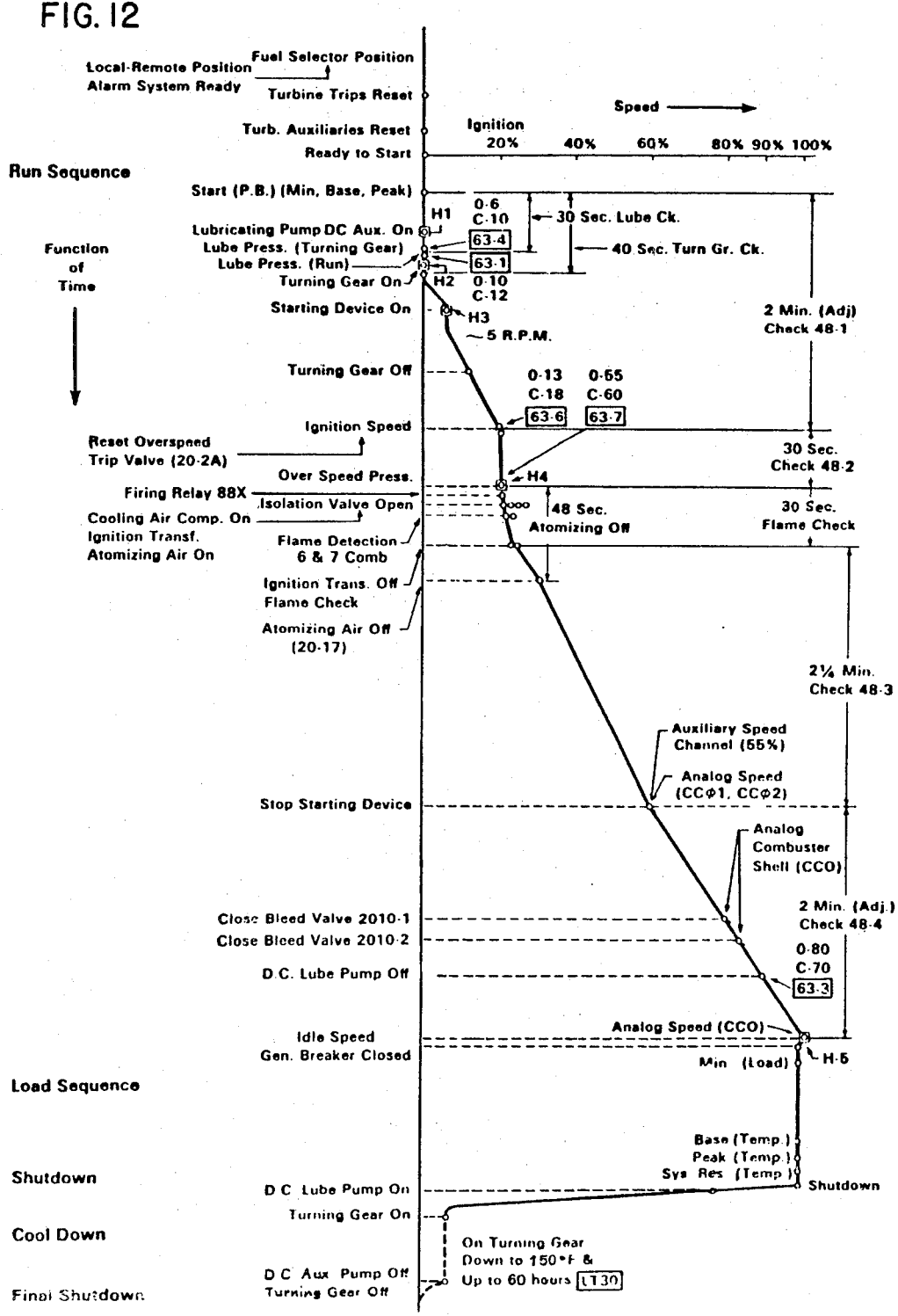
FIGS. 12A–B show a sequence chart for startup and shutdown of the gas turbine power plant.
Figure 12A:
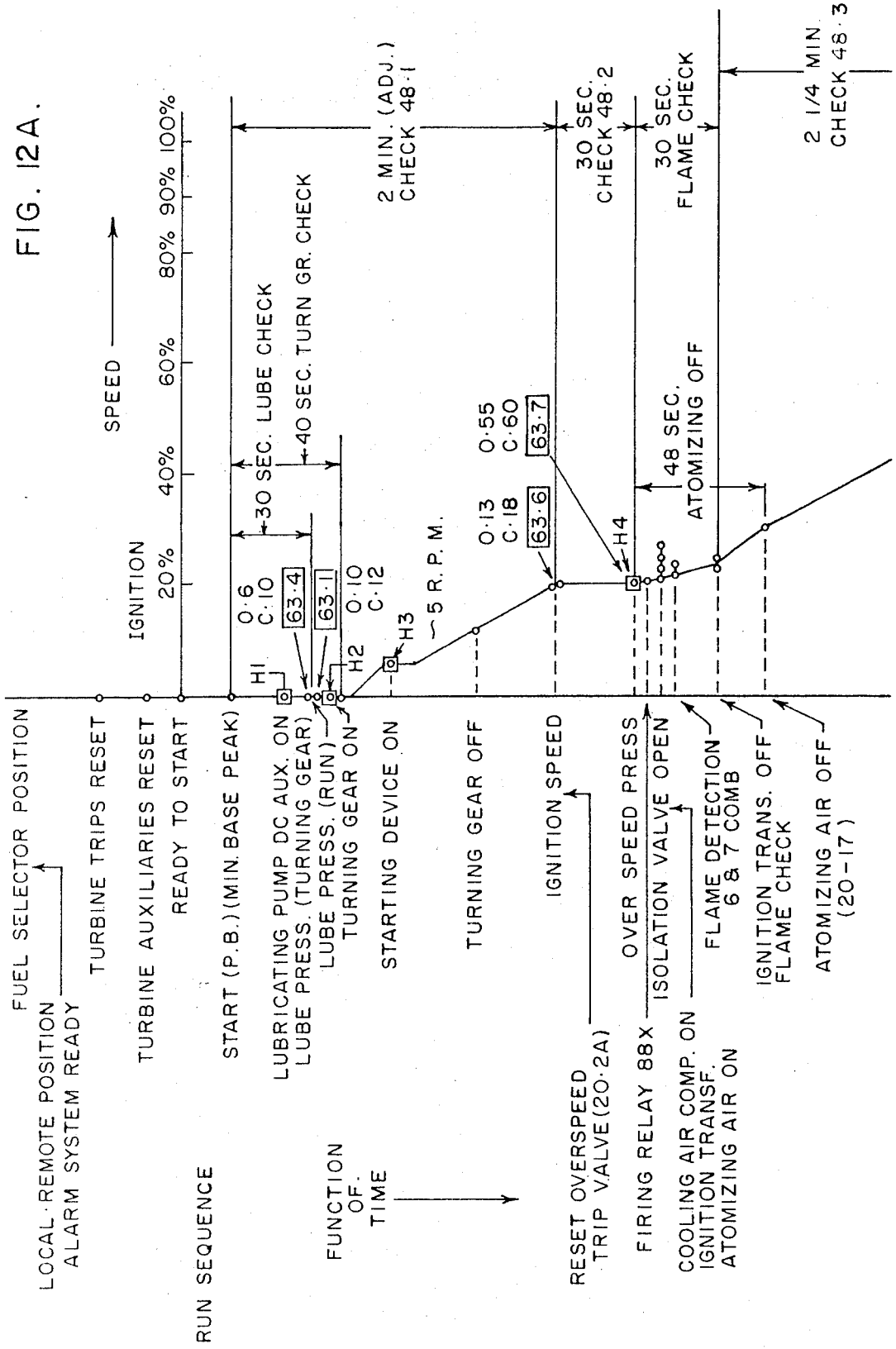
Figure 12B:
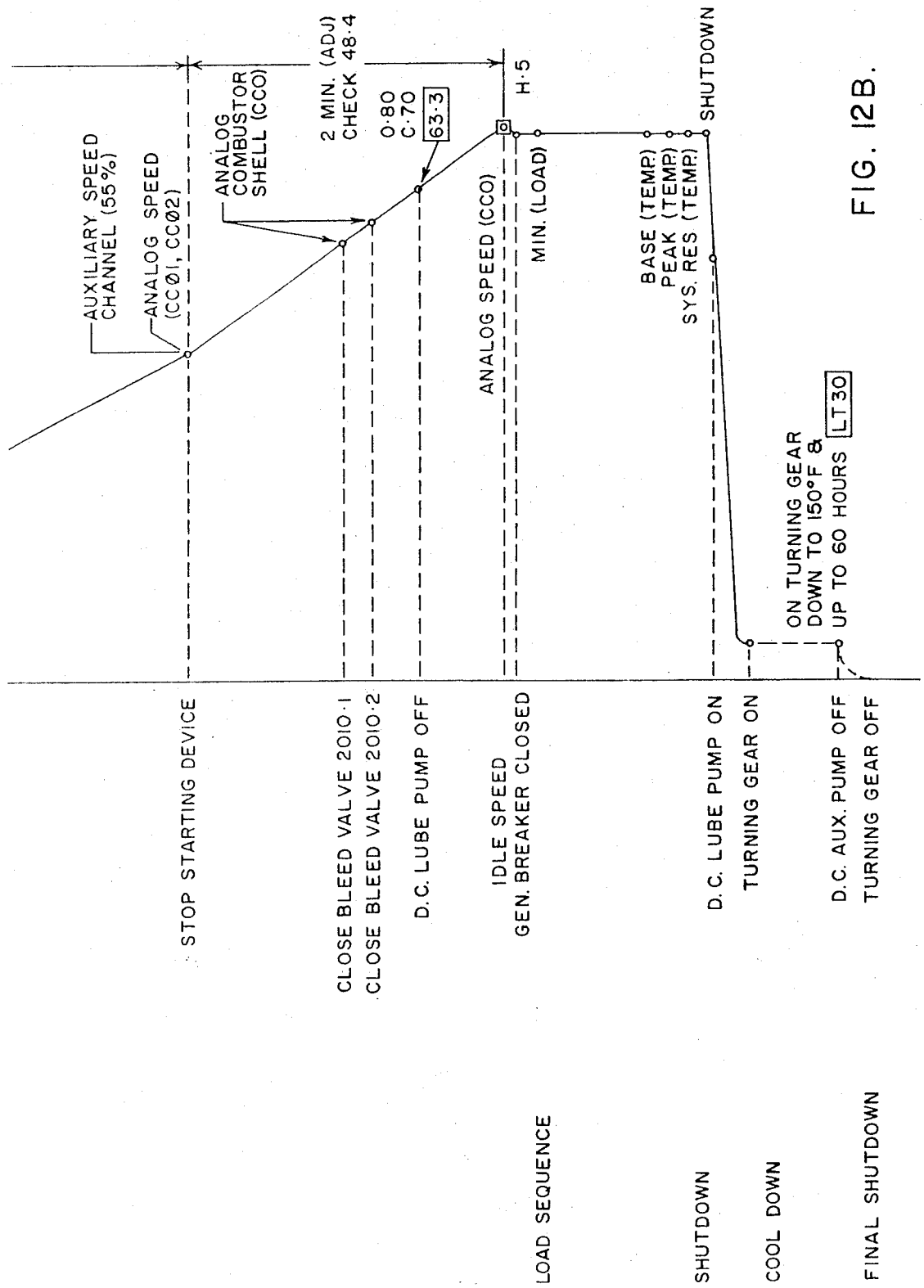

In FIG. 11, a control loop arrangement 302 represented by SAMA standard function symbols characterizes the preferred general control looping embodied in the preferred control system 300 and applicable in a wide variety of other applications of the invention. Reference is made to the aforementioned copending application Ser. No. 82,470 Section B2, pages 39 to 51, wherein there is contained a more detailed discussion of the control loop 302.

Briefly, the control loop arrangement 302 comprises an arrangement of blocks in the preferred configuration of process control loops for use in operating the gas turbine power plant 100 or other industrial gas turbine apparatus. No delineation is made in FIG. 11 between hardware and software elements since many aspects of the control philosophy can be implemented in hard or soft form. However, it is noteworthy that various advantages are gained by hybrid software/hardware implementation of the control arrangement 302 and preferably by implementation in the hybrid form represented by the control system 300.

Generally, in the various control mode sequences to be hereinafter more fully discussed, the plant 100 is started from rest under control of loop 302, accelerated under accurate and efficient control to synchronous speed, preferably in a normal fixed time period, synchronized manually or automatically with the power system, and loaded under preferred ramp control to a preselectable constant or temperature limit controlled load level, thereby providing better power plant management.

In the combination of plural control loop functions in the arrangement 302, a low fuel demand selector block 316 is preferably employed to limit the speed reference fuel demand representation if any of three limit representations are exceeded by it during startup. These limit representations are generated respectively by a surge control 318, a blade path temperature control 320, and an exhaust temperature control 322. In this application, a load control block 324 becomes operative after synchronization with the limit blocks 318, 320 and 322. Thus, the operation of the plural control loop 302 as a function of the various limit representations varies during the various control modes of operation.

At the output of the low fuel demand selector 316, the fuel demand representation is applied to a dual fuel control 317 where the fuel demand signal is processed to produce a gas fuel demand signal for application to the gas starting and throttle valves, 256 and 258 respectively, or a liquid fuel demand signal for application to the oil throttle and pressure bypass valve or as a combination of gas and liquid fuel demand signals for application to the gas and oil valves together.

In order to start the plant 100, the control system 300, operating in control Mode O, requires certain status information generated by the various process sensors. Once it is logically determined that the overall plant status is satisfactory, the plant startup is initiated. Plant devices are started in parallel when possible to increase plant availability for power generation purposes.

As control is transferred through the various control modes a feedforward characterization is preferably used to determine representation of fuel demand needed to satisfy speed requirements. Measured process variables including turbine speed, the controlled load variable or the plant megawatts, combustor shell pressure and turbine exhaust temperature are employed to limit, calibrate or control the fuel demand so that apparatus design limits are not exceeded. The characterization of the feedforward speed fuel demand, a surge limit fuel demand and a temperature limit fuel demand are preferably non-linear in accordance with the non-linear characteristics of the gas turbine to achieve more accurate, more efficient, more available and more reliable gas turbine apparatus operation. The control arrangement 302 has capability for maintaining cycle temperature, gas turbine apparatus speed, acceleration rate during startup, loading rate and compressor surge margin.

The fuel demand in the control arrangement 302 provides position control for turbine gas or liquid fuel valves. Further, the control arrangement 302 can provide for simultaneous burning of gas and liquid fuel and it can provide for automatic bumpless transfer from one fuel to the other when required.

The control arrangement 302 is implemented such that different process variables are given greater weight in determining the control function to be performed as control progresses sequentially through the modes of operation.

3. Control System.

The control system 300 is shown in block diagram detail in FIG. 9. It includes a general purpose digital computer system comprising a central processor 301 and associated input/output interfacing equipment such as that sold by Westinghouse Electric Corporation under the trade name Prodac 50 (P50). Generally, the P50 computer system employs a 16,000 word core memory, with a word length of 14 bits and a 4.5 microsecond cycle time.

More specifically, the interfacing equipment for the computer 301 includes a contact closure input system 309 and a conventional analog input system 311. Sixty-four input/output channels each having 14 bit parallel paths into and out of the main frame are provided. Each of the employed interrupt inputs causes a separate and unique response within the computer main frame without need for additional input operations thereby allowing the processing of interrupt input signals with very little main frame duty cycle.

Process inputs are provided by the contact closure input system 309 and the analog input system 311. The contact closure input (CCI) system is coupled to the operator console panel 120 and remote operator's panel 323. Characteristic CCI's are those related to the starting engine contacts. Also, a facility exists for customer selection of devices to be coupled to the CCI system.

Characteristic inputs to the analog input system 311 are the outputs from the various plant process sensors and detectors, namely, turbine 104 sensors such as blade path and exhaust manifold thermocouples. Additional inputs are those from a combustor shell pressure sensor and the main and backup speed sensors. The speed sensor outputs are coupled to the analog input system 311 through an analog speed control 327 and an auxiliary speed limiter 329, respectively.

The computer supplies essential outputs of various description for display at the operator's console 120 or the like. They are also applied as analog inputs as indicated by reference character 364. The contact closure output system 319 transfers digital speed reference, speed/load limit and fuel transfer outputs to its external circuitry as indicated respectively by the reference characters 335, 337 and 339.

The coupling of the contact closure output system 319 with the analog speed control 327 is within the framework of the preferred software/hardware hybrid control system. Another contact closure output 343 to the analog speed control 327 provides for a minimum fuel flow into the turbine combustor system in order to prevent flameout after ignition.

An analog dual fuel control system 317 is operated by the speed control 327 to determine the position of the liquid and gas fuel valves considered in connection with FIGS. 9 and 11. A contact closure output coupling to the dual fuel control 317 provides for transfer between fuels or relative fuel settings for two fuel or single fuel operation as indicated by the reference character 343.

The contact closure output system 319 is also connected to the operator's panel 120 and to sequence the starting engine 126. A synchronizer detection circuit 352 has bus line and generator potential transformers coupled to its input and the contact closure output system 319 signal provides a visual panel indication for manual synchronization. The detection circuit 352 also supplies signals to the analog input system 311 for automatic synchronization when such synchronization is employed as considered more fully in the aforementioned Reuther and Reed copending patent applications.

Other devices operated by the contact closure outputs include the generator field breaker and the generator line breakers 131 and 139. The motor operator generator exciter field rheostats 171 and 177 and various devices in the motor control center 130 and the pressure switch and gauge cabinet 152 also function in response to contact closure outputs. The printer or teletype 313 is operated directly as a special input/output channel to the main frame 304.

Turning now to a consideration of FIGS. 9 and 10 in relation to the inlet guide vane control function of the present invention, guide vane control block 345 is continuously operative in response to a computer determined control input derived as a function of actual turbine speed in the normal modes of turbine control, to be hereinafter more fully described. The inlet guide vane actuator piston (FIG. 3A) is positioned in response to a pneumatic signal developed by electro-pneumatic converter 345 in response to the analog signal output by guide vane control block 345. The guide vane control block 345 represents a combination of computational and systems programs which compute a digital control value, and after appropriate conversion, output an analog control signal to the Contact Closure Output System in a manner subsequently described in connection with the Analog Output Program (Section D.6).

Figure 10B:
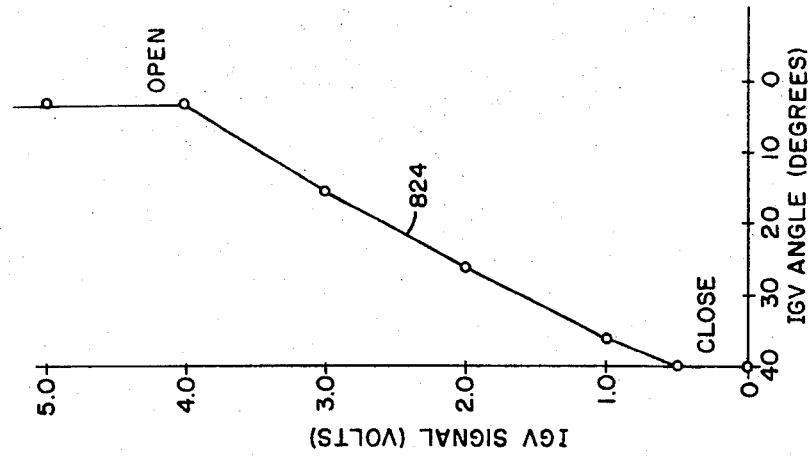
FIG. 10 illustrates various curve data employed in the control system computer useful in determining positioning of the variable inlet guide vanes.
Figure 10A:
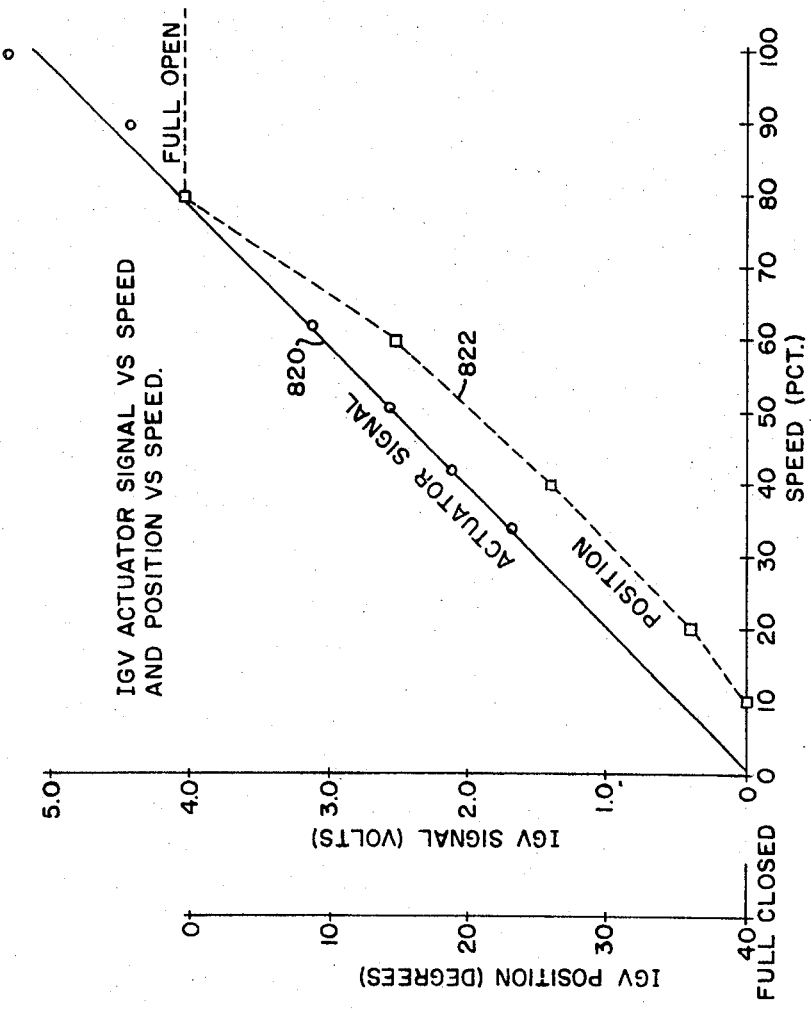

Derivation of the inlet guide vane control signal as a function of speed is demonstrated in FIG. 10A. Engineering specification for the instant implementation dictates a correspondence of 1 volt to 20% of full turbine speed and 5 volts to 95% of full turbine speed. With these constraints, the actuator signal line 820 may be derived as a linear function of percent of turbine speed passing through the points (20, 1) and (95, 5) by applying generalized straight line equation, $Y = MX + B$. Expressed in terms of turbine control variables and appropriate computer units we have:

I.G.V. Signal = 1.33 (Speed) −52.

Curve 822 shows the positioning of the guide vanes in response to the actuator signal input. During start-up, the angle 808 (FIG. 3B) is varied from 40°, or fully closed, at 0% speed to 3°, or fully open, at 80% speed. (A response lag exists as shown by the correspondence of 10% speed with 40°).

Curve 824 of FIG. 10B illustrates, more directly, the relationship between guide vane positions and actuator volts.

The foregoing is an abbreviated specification of a control system employed in implementing the preferred embodiment of the present invention, suitable for use in gas turbine electric power plant control. A more complete discussion of the preferred control system may be found in the aforementioned copending application Ser. No. 82,470, Section B3, pages 51 to 62.

4. Analog Circuitry

Figure 13A:
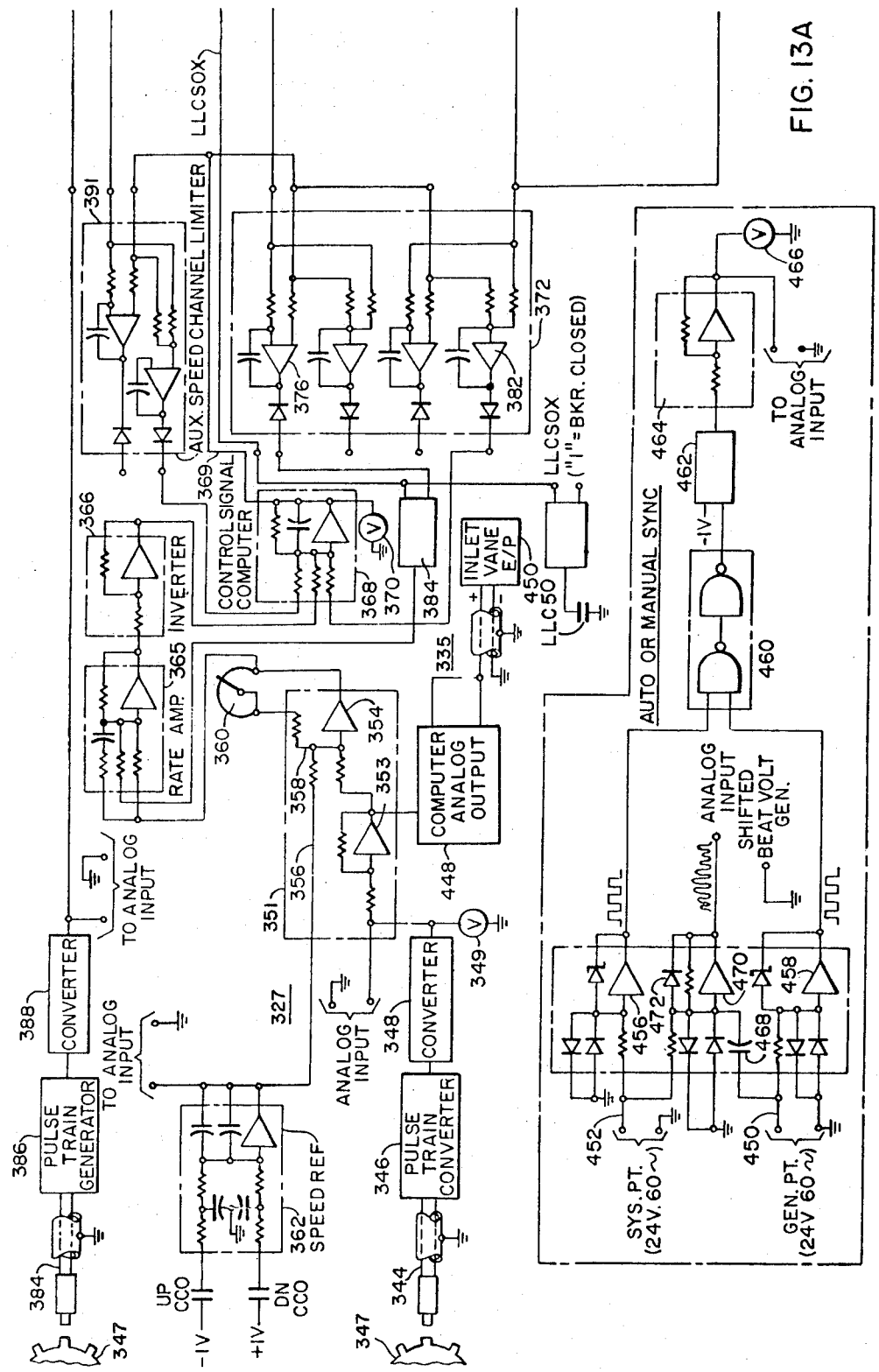
FIG. 13A and 13B show a schematic diagram of analog circuitry associated with the computer in the control system to provide control over gas turbine fuel supply system operations and certain other plant functions.
Figure 13B:
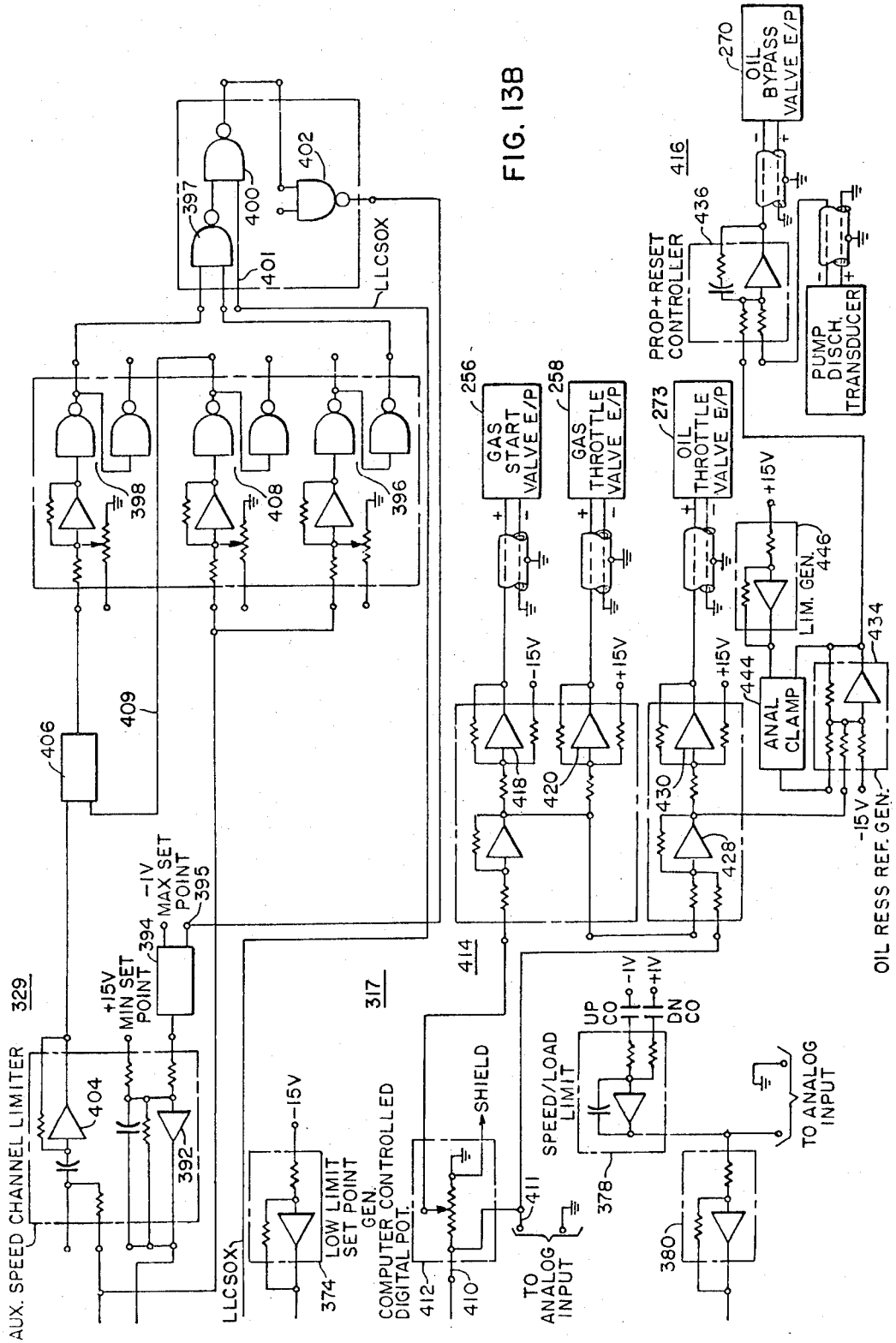

The speed control 327 operates in response to a main speed signal generated by a main turbine speed sensor 344 associated with a 44 tooth magnetic rotor wheel 347 as shown in greater detail in FIG. 13A. The main speed signal is converted into a sinusoidal output waveform having a constant width pulse at twice the input frequency. To derive a representation of the actual turbine speed, circuit block 348 converts the pulse train into a proportional direct voltage output which is then applied to error detector circuit block 350 and to analog input system 308 (FIG. 9).

A speed reference signal 356 derived from an analog output circuit block 362 and a speed regulation feedback signal 358 are also inputs to circuit block 350. The speed reference signal is determined from a digital command value generated by the computer.

Within circuit block 350, actual speed and speed feedback regulation signals are added to the speed reference signals to determine a speed error output signal. In the absence of fuel demand limit action, the speed error, amplified in circuit block 368, is generated on line 369 as the fuel demand signal, or, contact signal output (CSO), and input to the fuel control system 317. Monitoring is provided by meter 370.

Low and high limits are generated by setpoint signal generators 374 and 378 and imposed on the fuel demand signal in circuit block 372 by clamp amplifiers 376 and 382, respectively.

A backup speed limit is imposed on a backup speed limiter 329 in a manner similar to the foregoing. As will be readily appreciated, there exists a one-to-one functional correspondence between circuit elements 344 and 384, 346 and 386, 348 and 388 and other elements shown as similarly disposed in the schematic diagram depicted in FIG. 13A.

Additional clamp amplifier circuit 391 and speed limiter setpoint generator 392 cause the fuel demand signal output from circuit block 368 to be cut back to a predetermined minimum value if either of two logic conditions is satisfied. The first of such conditions is the operation of the turbine in excess of 108% of rated speed. An auxiliary speed signal is applied to the input of comparator circuit 396 which generates an output signal for application to an NAND circuit 397 when the speed signal is too high. As shown, NAND circuit 400 responds if LLCSOX exists, to generate a switching signal via the logic inverter 402.

In a like manner, a speed derivative signal is processed to detect as a second logic condition an excess acceleration between 102% and 108% of rated speed, such that, upon comparison with a predetermined acceleration limit and determination in circuit block 398 that the speed derivative signal is greater, an output to logic switch 394 is generated and coupled to the control input of clamping amplifier 329 as already described. The fuel demand signal generated at the output of the fuel demand amplifier 368 accordingly is representative of the fuel needed to satisfy the computer generated speed reference, the fuel needed to satisfy a computer determined limit action, the low limit fuel demand needed to prevent flameout during normal speed operations, or to cause turbine speed cutback without flameout when overspeed conditions are detected by the auxiliary speed limiter circuit 329.

At an input 410 to the duel fuel control system 317 the fuel demand signal is applied across a computer controlled digital potentiometer 412 which is illustrated schematically as an analog potentiometer. The fuel demand signal is also applied to the computer analog input system 311 for programmed computer operations. The total fuel demand signal is ratioed between the gas fuel control systems 414 and 416 to produce the individual fuel flows which satisfy gas turbine operation demands.

The gas fuel demand signal is applied to signal range adjuster amplifiers 418 and 420 which provide predetermined operation characterization for the gas start valve 256 and the gas throttle valve 258 respectively.

A signal range adjuster amplifier 430 operates on the liquid fuel demand signal to produce control on the liquid fuel throttle valve 273 again, in accordance with a predetermined operation characterizatiton. Additional liquid fuel control is provided by a pressure reference generator 434 and a rate controller 436 which serve to operate the liquid fuel bypass valve 270 in accordance with a predetermined pump discharge pressure characterization.

The inlet guide vane control 345, considered previously in connection with FIG. 9, is represented by a computer analog output block 448 which outputs a voltage analog of a computer derived guide vane position control value computed as a linear function of the sensed speed signal derived from the main speed channel 327, or alternatively, consistent with the principles of the present invention, such value may be derived in a manner functionally related to a stored profile of combustor shell pressure versus turbine exhaust temperature. The computer derivation of these alternative control values which determine the value of the analog output signal controlling inlet guide vane electropneumatic converter 450 (350 of FIG. 9) will be hereinafter more fully discussed. (Section D.8).

Briefly, deriving a control signal value as a function of turbine speed continues from startup to top or synchronous speed. Ideally, the speed is fixed during loading so that the guide vanes remain fully opened until Mode 4 control has brought the exhaust temperature to within 50°F. of the predetermined base load reference temperature. At this point in the control of the gas turbine 104, the computer analog output is determined in the alternative manner referred to hereinabove.

Additional functions performed by the analog system indicated in FIG. 9, as well as a more definite discussion of those elements enumerated above may be found in copending application Ser. No. 82,470, pages 63 to 74.

5. Control Panels

The operator's panel, considered in connection with FIG. 1, is included as part of an operator's console through which various process control functions may be initiated or altered. Additionally, process monitoring is provided in the form of various meters and alarms.

General control functions provided are the following:
a. Breaker pushbutton control,
b. Automatic synchronization ON/OFF,
c. Synchronizing mode selection.

Control functions specific to the gas turbine are as follows:
a. Normal start/stop,
b. Emergency start/stop,
c. Fuel selection,
d. Automatic fuel transfer.

Flexible generator control is provided in the form of panel functions which permit selection of manual or automatic voltage regulation.

Alarm condition indicators are provided by alarm lights and a horn blow. Typical conditions giving rise to alarm status indications are those pertaining to system failures during startup. Alarms are provided which are associated with specific process monitoring devices such as generator vibration detectors, combustor basket flame detectors, and blade path and exhaust manifold thermocouples. A facility is provided for initiating computer determined alarm status responsive control functions.

In the preferred embodiment, increased control flexibility is achieved through the provisions of one or more remote control panels which, desirably, duplicate the functions of the local operator's panel.

A detailed discussion of the control panels may be found in the aforementioned copending application Ser. No. 82,470, at pages 74 through 97 thereof. Included is a listing of local and remote operator's panel contact closure output assignments, and a description of the entering of control parameter changes into the control system 300.

D. PROGRAM SYSTEM

1. General Configuration

Figure 14:
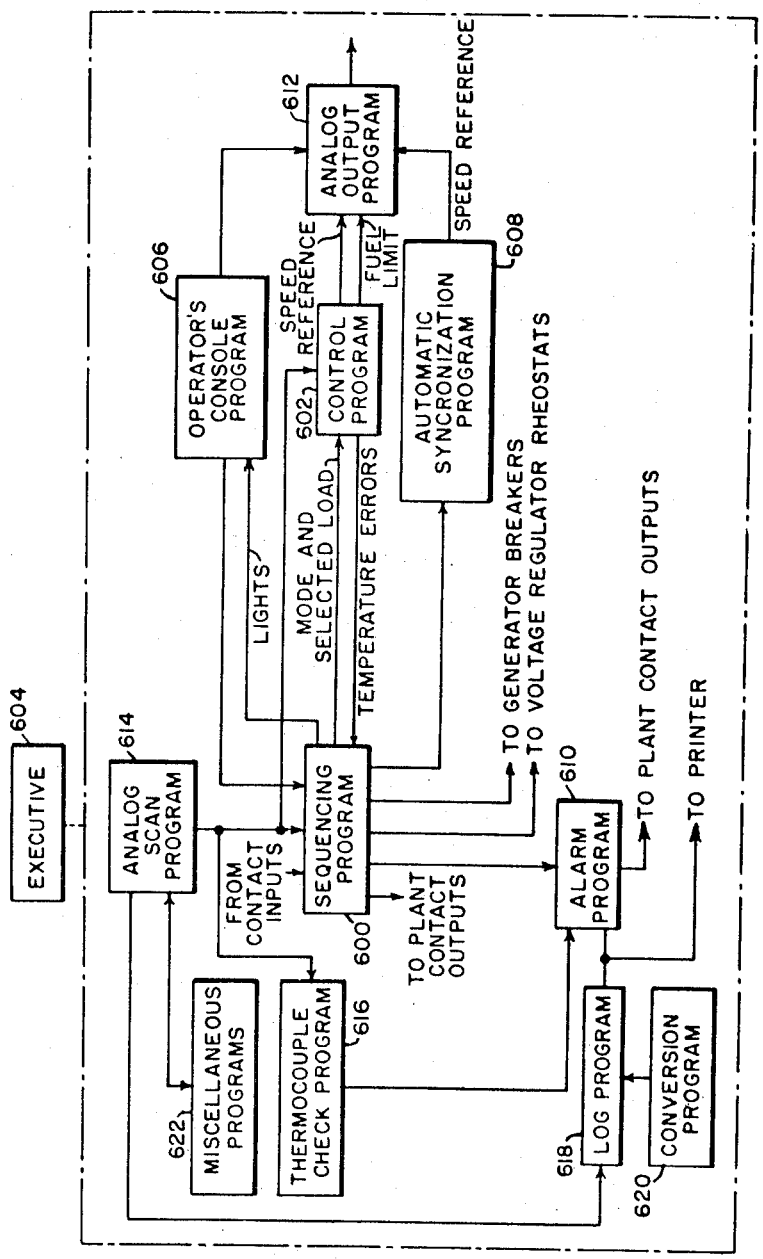
FIG. 14 shows a general block diagram of the organization of a program system employed in the control system computer.

The computer program system is organized to operate the computer system 305 so that it interacts with other control system elements and plant devices to operate the gas turbine plant 100 and other similar plants as required to produce electric power with many user advantages. As schematically illustrated in FIG. 14, the program system comprises a sequencing program 600 and a control program 602 which make most of the plant operational determinations for output to the control system interfacing and control hardware. An executive program 604 schedules the use of the computer 301 by the various programs in the software system in accordance with a predetermined priority structure. The executive program 604 also provides certain other functions considered more fully subsequently.

Generally, the sequencing program 600 accepts contact closure inputs, analog inputs, and operator console inputs from an operator console program 606 to provide through contact closure outputs plant startup and other functions including alarm and housekeeping tasks prior to, during and after startup. As indicated in FIG. 14, the sequencing program 600 supervises the control program 602 by specifying the control mode and the selected load. The control program 602 transmits data to the sequencing program 600 including, for example, hot blade path temperature indications during load operation which require plant alarm and shutdown.

An automatic synchronization program 608 is also supervised by the sequencing program 600 to provide for generator voltage regulator rheostat operation and turbine speed adjustment during automatic synchronization. The sequencing program 600 processes manual synchronization operation. It also transmits lamp light determinations to the operator's console program 606 and alarm determinations to an alarm program 610.

The operator's console program 606 is a package of subprograms which provides for interfacing the operator's panel 120 with the computer 301. The alarm program 610 provides for printout of detected alarms.

During the various modes of plant operation, the control program 602 makes intermediate control determinations which result in the determination of a turbine speed reference representation and a fuel demand limit representation for application as analog signals to the analog speed control 324 as previously described. Analog outputs from the control program 602, the automatic synchronization program 608 and the operator's console program 606 are processed by an analog output pulser program 612 to provide for generation of accurate external analog voltages corresponding to the internal digital determinations. Analog inputs for the sequencing program 600 and the control program 602 and other programs are determined and stored by an analog scan executive program 614.

A thermocouple check program 616 makes a validity check on the thermocouples not checked by the sequencing program 600 or the control program 602 and generates an alarm for alarm program printout when a thermocouple reading indicates an open circuit.

A log program 618 operates in conjunction with a conversion program 620 to generate a periodic printout of the values of predetermined analog inputs. Other programs included in the program system are classified as miscellaneous programs 622.

2. Executive System

In the program system, the individual programs are repeatedly executed under control of executive program 604, typically with only the program variables changed. An executive priority system consisting of sublevel structured dominant and secondary levels defines the order in which programs are executed.

Dominant sublevel programs are executed according to real time, i.e., a program which is first bid is executed first if two programs are bidding to run simultaneously. Secondary sublevel programs are executed according to a preestablished hierarchy.

3. Programmer's Console Package

The programmer's console programs are provided to facilitate communication with the P50 computer. Generally, the console package provides a means for loading programs into the computer, executing programs, loading constants or instructions and dumping areas of main and extended core memory. Core locations can be dumped in binary on tape or in octal on a keyboard. The programmer's console package operates within the priority structure of the executive program 604, and its elements are generally classified as a part of that program.

4. Operator's Console Program

Figure 19:
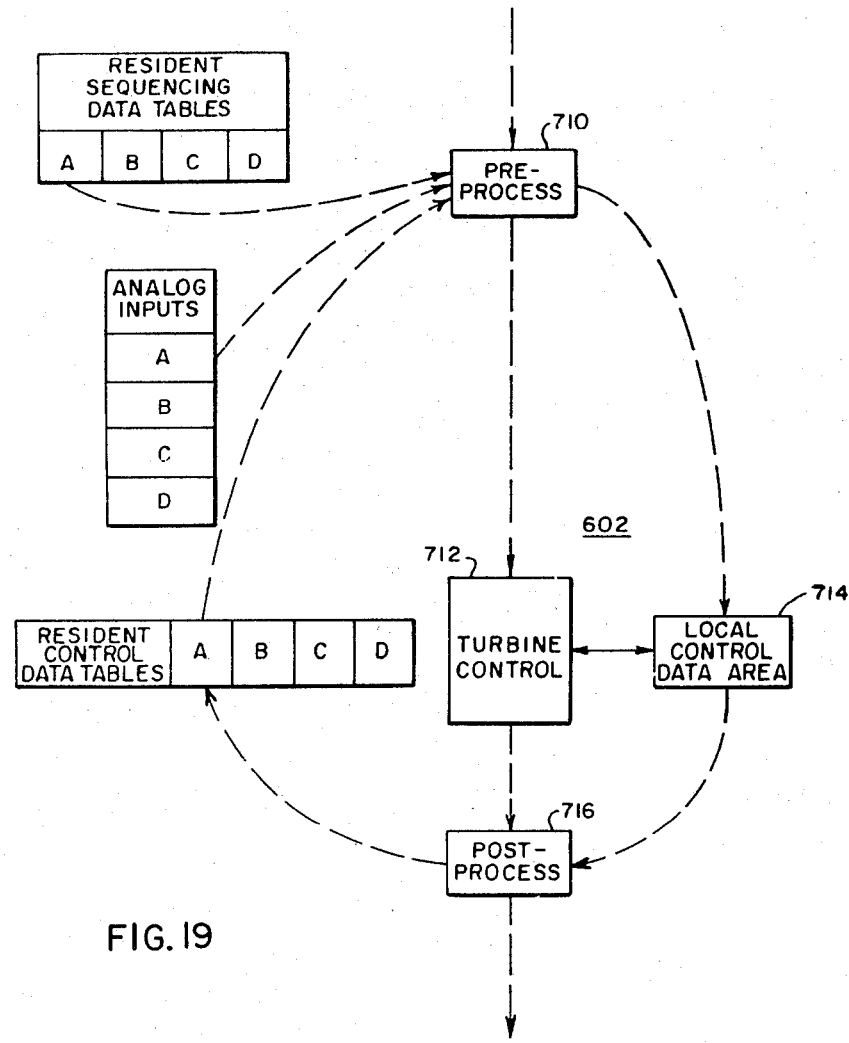
FIG. 19 a data flow diagram associated with control program operations during controlled operation of multiple gas turbine power plants with a single control computer.

As indicated in FIG. 19, an operator's console program is provided which interfaces with both the sequencing program 600 and the analog output program 612. Generally, a depressed local operator's pushbutton causes the interrupt routine to bid a dominant level operator's console program, which when active determines the requested action. In the event that generator breaker closing, line breaker closing or emergency shut-down have been requested, priority execution of associated programs results. Other indicated actions occasion the requesting of an associated secondary sublevel program, which is then placed into the bidding state. Operator/Executive System communication is provided during all modes of gas turbine control.

5. Analog Scan Program

Generally, the analog scan program provides an executive function in reading all analog points associated with the power plant 100 and any similar plant units. The frequency at which the analog points are read is determined by the needs of the process operation, and in this instance, it is set at 30 points per second. The analog scan program can be executed under hardware or software interrupt lockout.

6. Analog Output Program

As previously considered, the general approach employed for generating analog outputs is to employ external holding type operational amplifiers with the amplifier output measured by the computer through the analog input system 311. The measured value is compared with the desired value and the difference is employed in determining how long raise or lower contact closure outputs must be closed to make the holding amplifier integrate to the desired value. The raise or lower value is computed in tenths of a second, and it is determined by an element of the analog output program 612, which is run on a secondary level while the actual contact closure output pulsing is performed by a pulser element of the analog output program 612, run on a dominant level every tenth of a second. The secondary level analog output program element is run every second for speed reference and load limit and every five seconds for the remaining outputs.

The foregoing brief discussions of system components 2 through 6 are herein included to provide in summary form a general description of the control environment which is more fully described in copending application Ser. No. 82,470, Sections D2 through D6, pages 101 through 115.

7. Sequencing Program a. Functional Philosophy

Figure 15:
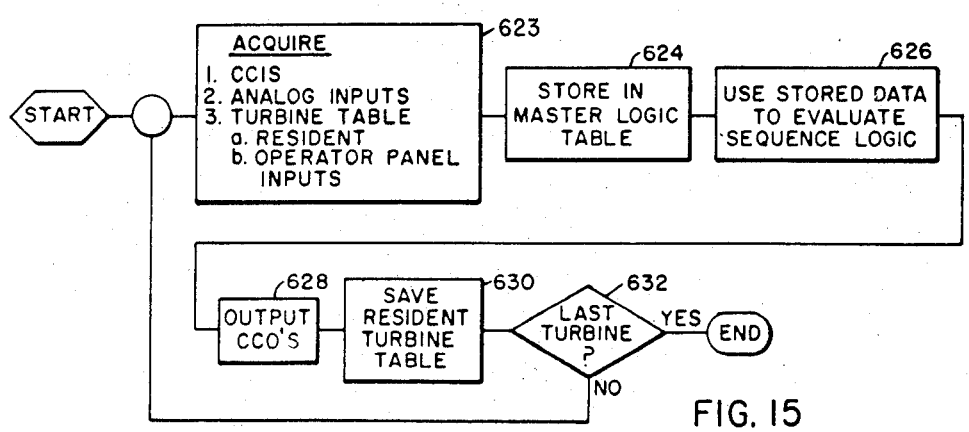
FIG. 15 illustrates a flowchart for a sequencing program associated principally with startup operations for the gas turbine.
Figure 27:
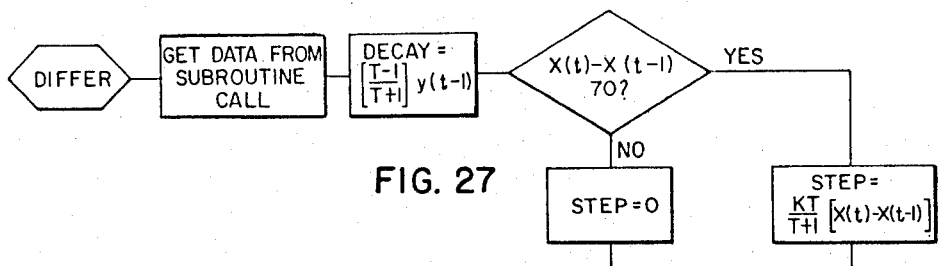
FIG. 27 shows a flowchart for a rate function employed in temperature limit operations.

Generally, the sequencing program 600 is represented by a flowchart shown in FIG. 15 and it is run once every second to provide the plant sequencing operations required during turbine startup, to provide certain alarm detections and to provide sequencing for various plant tasks during time periods other than the turbine startup time period. As indicated by block 623, certain information regarding the status of the turbine plant 100 and other controlled plants is required for sequencing program execution. The required plant status information which is acquired includes continuous analog data and contact input closures generated by operator panel switches, pressure switches, and other plant devices. The acquired information is stored in a master logic table as indicated by the block 624. Next, in providing ultimately for better plant startup management and better plant management generally, the stored data is employed in the evaluation of a plurality of blocks of sequence logic as indicated by block 626.

The results of the evaluation of the sequence logic may require communication with other programs in the program system in which event the results are stored for use by those programs. As indicated by block 628, the results of the evaluation of the sequence logic may also require certain contact closure outputs. In block 630, a resident table of turbine data acquired from core memory by the acquisition block 623 is saved in the original core memory location while non-resident turbine data comprising operator panel inputs is allowed to be destroyed.

Block 632 then determines whether any additional turbines need to be processed in the current run of the sequencing program 600. If not, the sequencing program 600 is ended. If one or more gas turbines remain for sequencing logic determinations in the current run of the sequencing program 600, the program 600 is re-executed for the next turbine and the process is repeated until the last turbine has been serviced with sequence logic processing in the current sequencing program execution.

Figure 16:
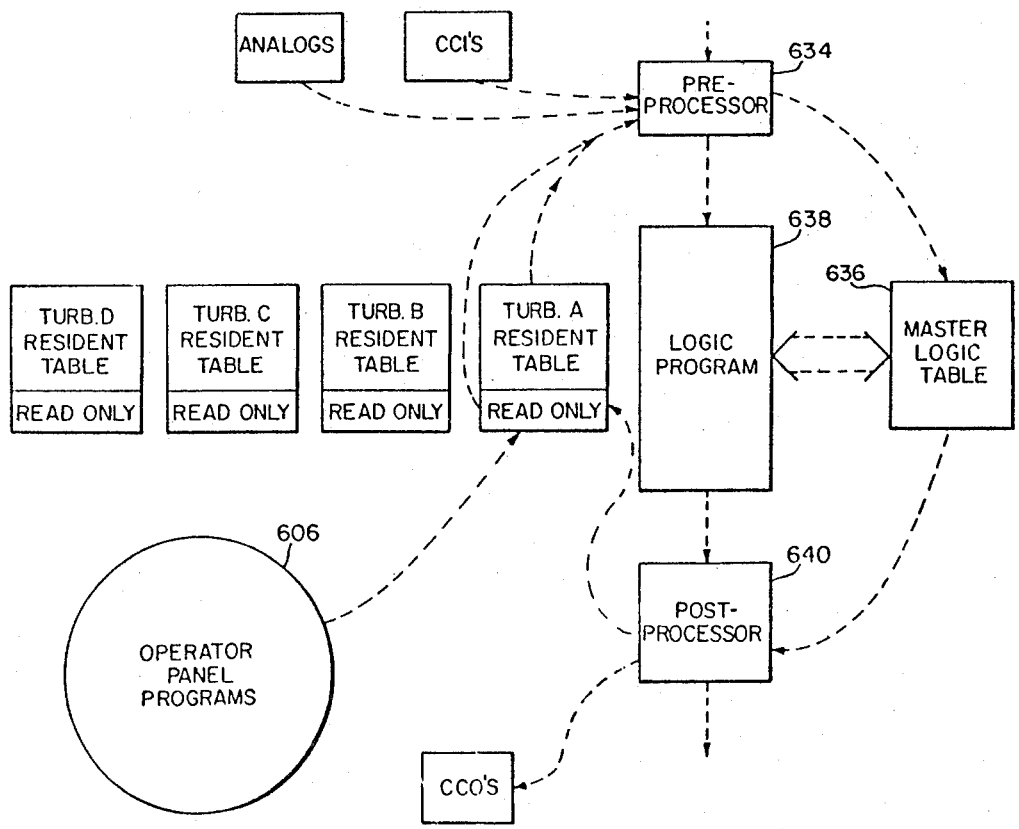
FIG. 16 shows a data flow diagram which illustrates the manner in which the sequencing program is executed to provide multiple power plant operations with a single control computer.

In FIG. 16, there is illustrated a data flow map for the sequencing program 600. As shown, there are four turbine data tables for the respectively designated gas turbines A, B, C and D. Each gas turbine data table comprises a resident portion and a read only portion which is derived from the operator panel program 606. A preprocessor block 634 corresponds to the block 623 shown in FIG. 15, and it obtains data from analog inputs, contact closure inputs, the resident turbine A table and the read only turbine A table. The acquired data is stored in a master logic table as indicated by block 636 which corresponds to block 624 in FIG. 15. The master logic table is employed in the execution of logic program block 638 which corresponds to block 626 in FIG. 15.

After the sequence logic has been evaluated by the program 638, a postprocessor 640 is entered and it corresponds to blocks 628, 630 and 632 in FIG. 15. Thus, contact closure outputs are generated and the turbine A resident table is saved. The postprocessor 640 then provides for a repeat program execution for turbine B table data if a second gas turbine plant is under control. Similarly, repeat executions are made to provide for entry and restorage of turbine C table data and turbine D table data if C and D gas turbine plants are under control. After the last turbine sequence program execution has been employed, an exit is made from the postprocessor block 640.

b. Sequencing Program Table Data Tables and Preprocess and Postprocess Routine Information on core organization of the turbine read/write and read only tables, contact closure input and output data tables, the master logic table and turbine alarm data tables may be found in Section D7b., pages 117 to 150 of the aforementioned copending application Ser. No. 82,470. Additional information on the contact closure input routines, analog input routines and contact closure output routines employed in blocks 623 and 628 is included therein.

c. Plant Sequence Functions

Generally, the sequence control subsystem embraces certain logic operations which provide for an orderly advance of the process through startup, run and shutdown operations while providing many operating advantages. In providing sequence operations, the sequence control subsystem includes the sequencing program which interacts with the control program and with plant devices to provide direction to process events and simultaneously to provide plant and turbine protection.

In the startup process, a programmed computer master contactor function and operation selectors are employed to force the sequence of starting and operation to assure that turbine startup will normally take place over a fixed predetermined time interval. The software master contactor serves to establish and disestablish logic conditions necessary for initiating the making and breaking of external control circuits for equipment startup and shutdown operations under predetermined plant and equipment conditions.

After ignition, programmed sequencing logic causes the control system 300 to be placed in Mode 1 operation and the gas turbine speed reference is increased in a program controlled nonlinear manner to determine the fuel valve positioning.

When the turbine 104 has been advanced to idle (or top or synchronous) speed, it is ready to be synchronized and the control system 300 is transferred to Mode 2 operation in which either manual or automatic synchronizing is performed following field breaker closure. When the turbine-generator unit is synchronized and the generator breaker is closed, the control system 300 is transferred to Mode 3 or Mode 4 operation and the speed reference is set at a value of 106% rated speed. Load is ramped to a predetermined level at a predetermined rate under programmed computer operation.

Shutdown of the gas turbine is caused if any of three time checks fail during the startup sequence. The first time check measures time from initiation of the master contactor function to ignition speed. In addition, a check is made on the time detection of flame in both combustor baskets to 60% speed. Further, a check is made on the time from starting engine trip at 60% rated speed to idle speed.

d. Sequence Logic Charts

Figure 17A:
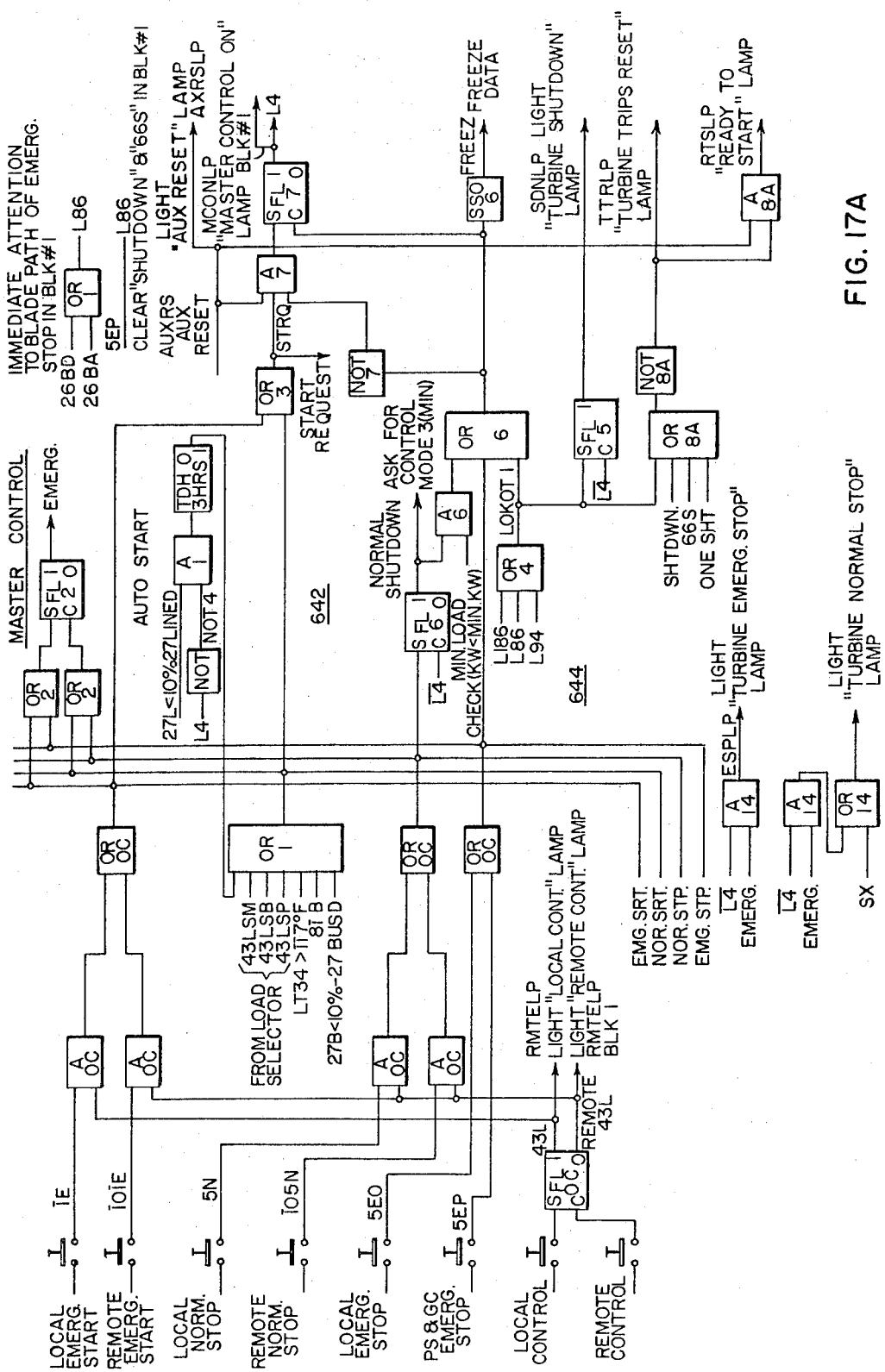
FIG. 17A-B show a logic diagram representative of the sequencing logic performed by the sequencing program.
Figure 17A:
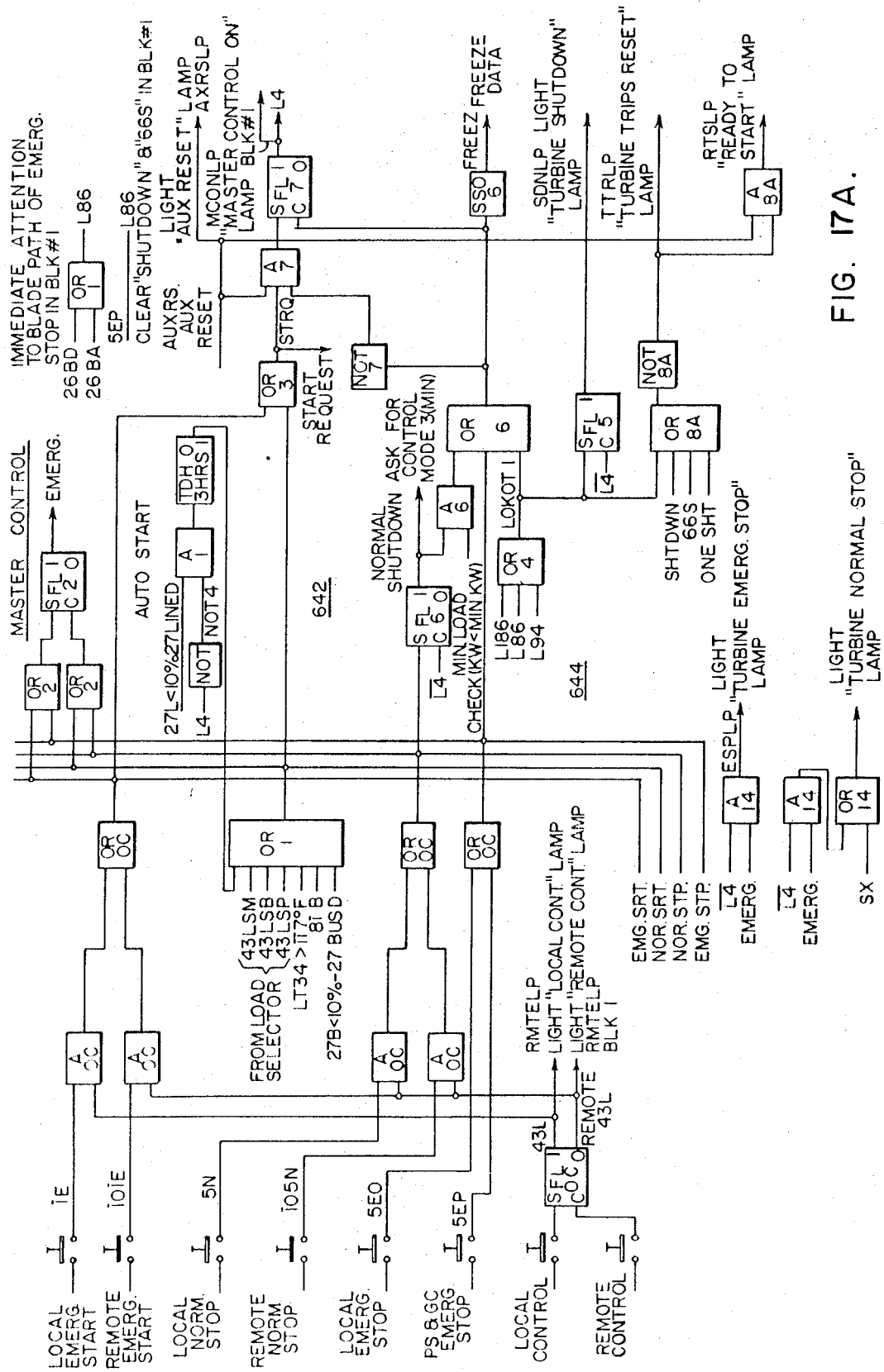
Figure 17B:
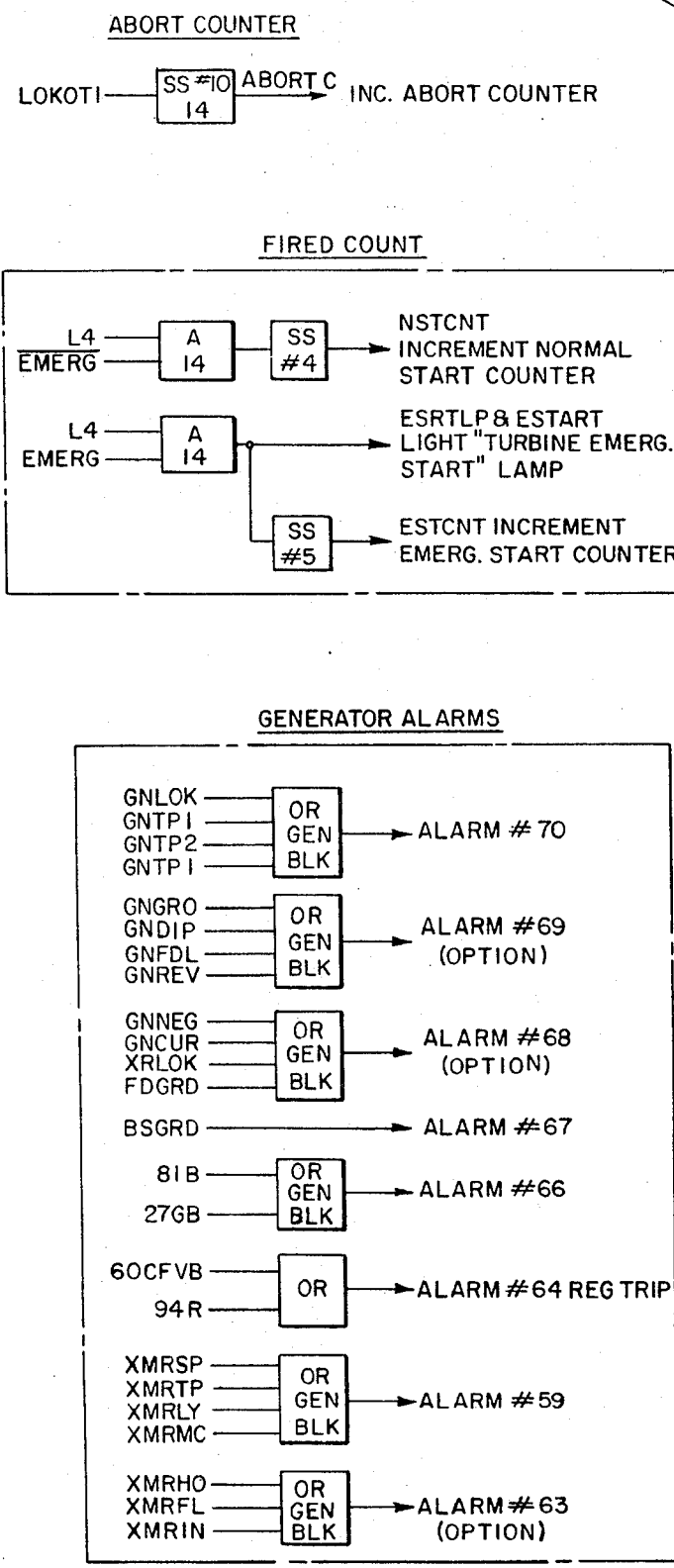

In FIG. 17, there are shown logic diagrams of representative alarm and sequencing functions performed by the sequencing program 600 in block 626 (FIG. 15) each time it is executed. Predetermined logic building blocks are employed in defining the conditions for the performance of the sequencing program functions. Each block contains a symbol identifying its function and a number of alpha-numeric character providing a program block identification. The logic function identifying symbol is generally located above the program block identification character. The following is a list of the logic symbols and the logic functions to which they correspond:

| | |
|---|---|
| A | And |
| OR | OR |
| FL | FLIP FLOP |
| SS | SINGLE SHOT |
| DB | DEAD BAND |
| NOT | INVERSION |
| TDH | TIME DELAY - HOURS |
| TDS | TIME DELAY - SECONDS. |

There is principally shown the logic associated with start/stop operations and the master contactor or control function to which reference has already been made. Generally, logic diagram 642 pertains to the master contactor or control function generated by flip-flop FL7 as a function of pushbutton operations and other conditions. Similarly, logic diagram 644 relates to the generation of a shutdown operation in response to pushbutton, shutdown alarm and other conditions. Thus, shutdown OR block OR6 resets the master contact function flip-flop FL7 when a shutdown is initiated. In the logic diagram 644, alarm shutdowns are initiated by line L86 through block OR4. On shutdown, single shot block 6 provides for registering predetermined data.

Other sequencing program logic functions set forth in logic diagram form in FIG. 17 include a plurality of generator alarms designated as OR GEN BLK blocks. In addition, block OR1 provides for immediate shutdown on blade path over-temperature through block OR4. Single shot blocks 4, 5 and 14 respectively provide normal start counts, emergency start counts, and abort counts. A list of miscellaneous alarms is also included.

Further description of the plant sequence functions, associated sequence logic charts, macro instructions for sequencing logic and logic subroutines and macros related thereto may be found in the aforementioned copending application Ser. No. 82,467, Section D.7c. through D.7e. found at pages 151 to 164 thereof.

8. Control Program

The following brief discussion of a control program suitable for use in the preferred embodiment of the present invention may be considerably amplified by a reference to the corresponding section of one of the aforementioned copending applications, e.g., Ser. No. 82,470.

Figure 18:
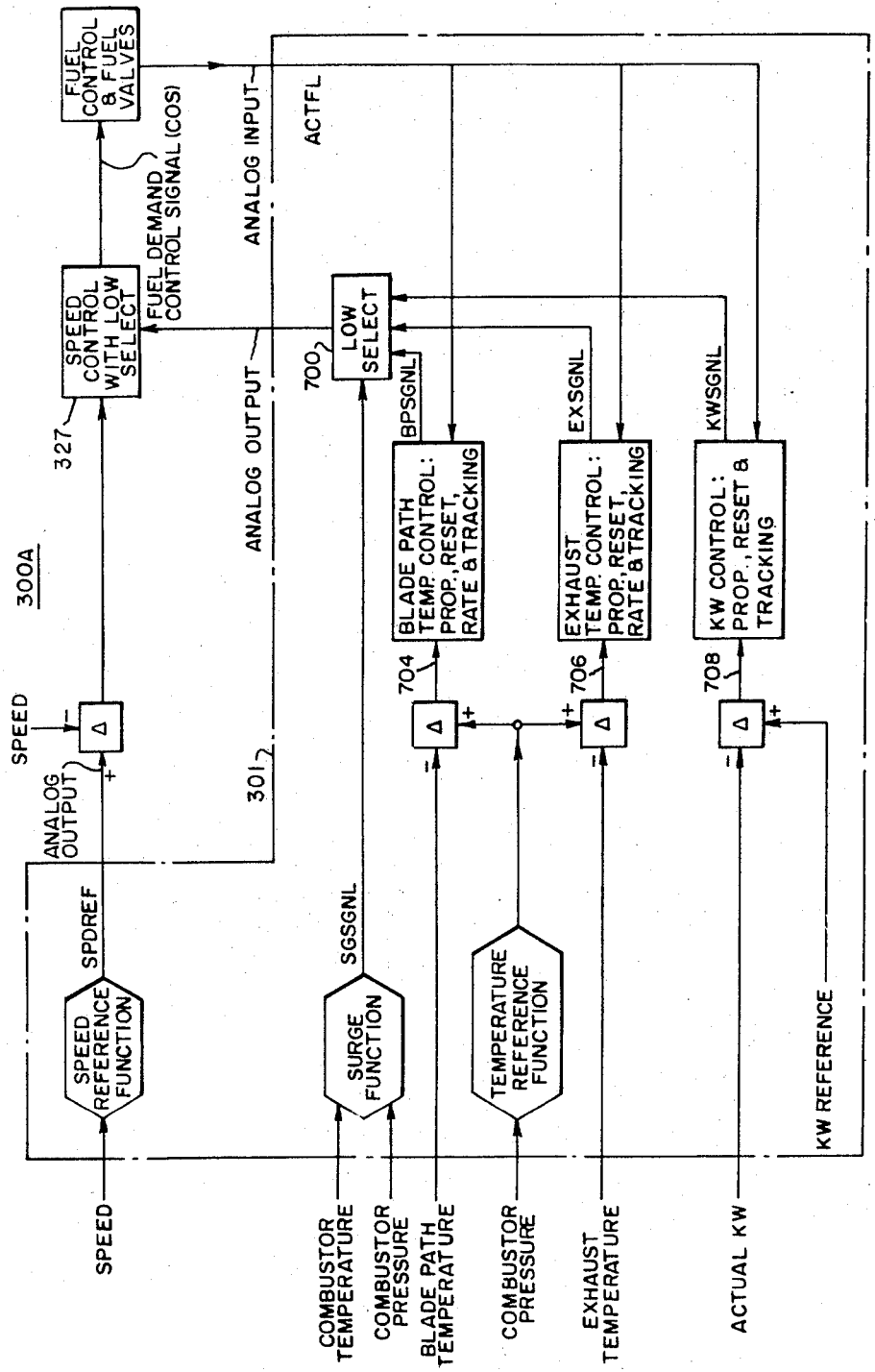
FIG. 18 shows a block diagram of a control loop arrangement implemented in the preferred embodiment.

As indicated in FIG. 14, the control program 602 interacts with the sequencing program 600 providing control loop determination of the operation of the gas turbine plant 100 and the like plants if provided. A preferred control arrangement is considered in FIG. 18. Upon determination by the sequencing program 600 of the control mode in which the control program 602 is to be operated and the accomplishment of the sequencing steps previously discussed, control program 602 becomes active, operating in the control loop arrangement 300A. The hybrid interface depicted provides for software speed reference generation and selection of a single low fuel demand limit in software low select block 700 for application to analog hardware speed control 327.

The output fuel demand signal is selected as the lowest at a speed error fuel demand signal and the computer output fuel demand limit signal as previously considered. The actual fuel demand control signal ACTFL is read as an analog input for tracking in various software control paths as considered more fully subsequently. Surge limit, blade path and exhaust temperature limit and load limit control loops are all provided with software control functions which respond to external data and generate outputs to the software low select block 700 as indicated by the respective reference characters 702, 704, 706 and 708.

Referring now to FIG. 19, execution of control program 602 proceeds as follows:

a. Preprocessing by block 710 of the resident control data table containing various parameters indicating current turbine status and a pointer to the sequencing table which contains a control mode indicator and the selected load and start-up status.

b. Analog control program data acquisition including blade path, exhaust and compressor inlet temperatures, combustor shell pressure, actual fuel demand signal and actual kilowatt output.

c. Reliability testing of acquired analog temperature readings to prevent overheating of critical turbine parts.

d. Execution of turbine control block 712, to be hereinafter outlined.

e. Block 716 postprocessing including table updates as indicated by the circular data flow.

The foregoing steps are repeated cyclically for turbines B, C and D if provided.

Figure 20:
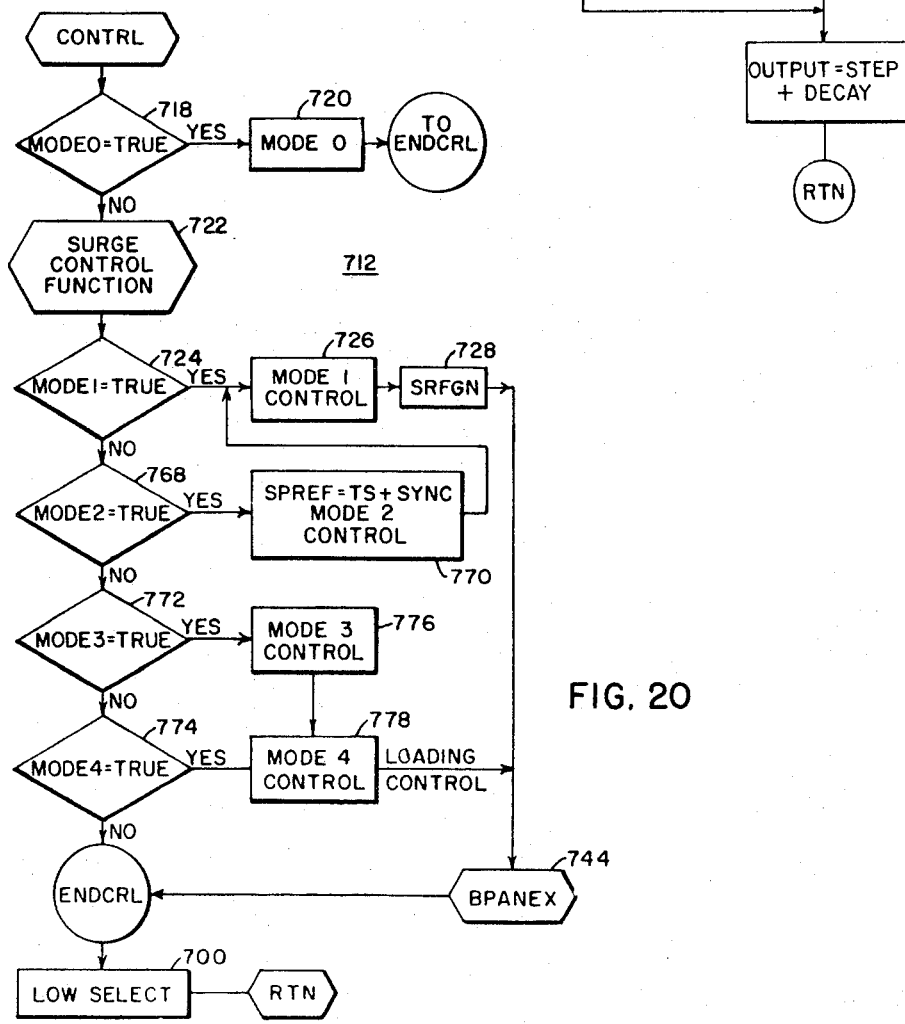
FIG. 20 illustrates a flowchart which represents control program operations in the preferred embodiment.
Figure 25:
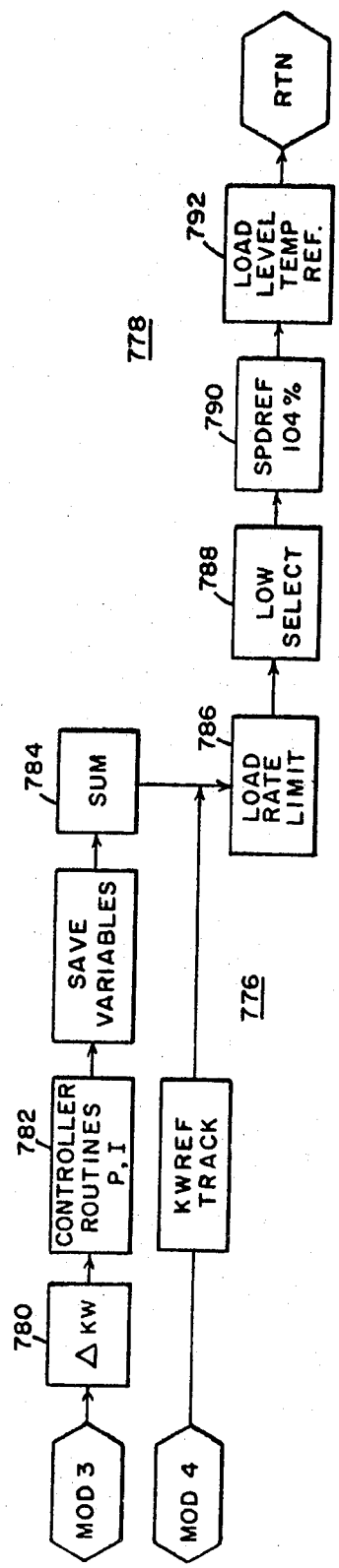
FIG. 25 shows a flow diagram for control program operations which provide load control and load limit functions for the gas turbine power plant.
Figure 26:
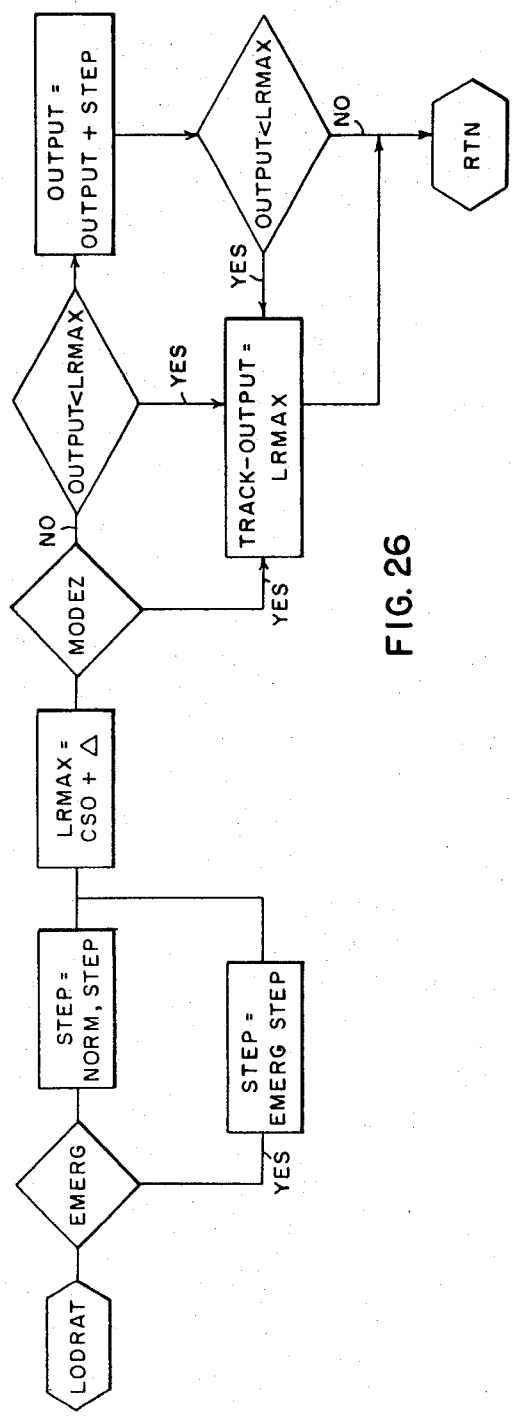
FIG. 26 illustrates a flowchart for a load rate limit function employed in the load control and limit operations illustrated in FIG. 25.

Turbine control block 712 is shown in greater detail in FIG. 20. As shown, control actions are directed consistent with turbine control mode directives. If block 718 determines that the turbine is in Mode 0 status, initialization is accomplished by the execution of block 720. Actual turbine speed tracking is provided so that a smooth transition is made in the computer generated speed reference during transfer from Mode 0 to Mode 1.

If control is not in Mode 0, block 722 next determines the surge control function for use in the surge limit control loop (FIG. 18) in all other modes of operation. The surge control function determines a maximum fuel demand limit as a function of the compressor inlet temperature and the combustor shell pressure (compressor outlet pressure) which are obtained from reliability checked analog inputs. A discussion of the surge limit functional determination may be found in copending application, Ser. No. 82,470, beginning at page 186 thereof.

In Mode 1, control block 726 is executed to provide acceleration control from ignition speed of approximately 1,000 RPM to the top speed of 4,894 RPM. Fuel demand signal tracking is provided and an nonlinear temperature reference is generated in a manner similar to that employed in surge limit functional determination, again, as discussed in the aforementioned copending application, Ser. No. 82,470. Temperature references as a function of combustor shell pressure are determined for both normal and emergency startups.

Repeated executions of the control routine 712 are made during the time period that the gas turbine 104 is placed under sequencing and acceleration operations in Mode 1 control. A speed reference for analog output to the speed control 327 is provided in block 728. Such reference is derived from previously input nonlinear curve representative of optimum fixed time acceleration for both normal and emergency startup as previously indicated. A linear interpolation routine similar to that described in connection with the surge limit functional determination is employed to derive acceleration values at working time points between the time points corresponding to the stored curve points. The speed reference algorithm may be found at page 50 of copending application Ser. No. 82,470.

The speed reference generation program is shown in greater detail in FIG. 21. Block 730 first determines if the gas turbine 104 has attained top or substantially synchronous speed. If this condition is satisfied, the speed reference routine is bypassed and a return is made to the turbine control program execution. If not, block 734 determines whether an emergency start has been requested. Block 736 and 738 correspond respectively to emergency and normal startups, and as shown a change in the speed reference required for the next sampling time interval is calculated. In block 740 the speed reference step change is added to the preceding speed reference.

A top speed limit is next placed on the speed reference by block 742 if block 744 detects an excessive speed reference value. If not, the speed reference value is stored and return is made to the execution of the control block 712.

Temperature control is provided as shown in FIG. 22. In the temperature limit routine 744 a temperature error is first determined by taking the difference between the temperature reference previously derived and the actual and preprocessed average blade path temperature. The output of block 746 is compared with a predetermined deadband in block 754. If an error exists outside the deadband, the sign is determined in block 756. If the blade path temperature error is negative, control action is imposed by block 758 with a proportional routine and an integral routine. Blade path temperature and temperature error variables are stored by block 760 and block 762 sums the results of the proportional and integral operations of block 758 to generate the blade path output limit representation BPSGNL.

If the blade path temperature error is positive, fuel demand signal tracking block 764 is executed so that faster control action may follow a change in temperature error from positive to negative, since through this device the reset routines do not have to integrate back from some saturated output value. In particular, the tracking action is such that the reset block output never exceeds the fuel demand signal by more than a difference value.

To obtain the tracking action, the desired difference value is added to the low selected fuel demand signal and the result is differenced from the output of a reset or integrator routine and applied to the input of the reset routine. The output of the integration operation accordingly tracks the fuel demand signal with a positive bias. Such tracking operation allows the tracking control loop to enter quickly into fuel control if required by a change in the error quantity controlled by the tracking control loop. The integration routine may be found at page 202 of copending application Ser. No. 82,467.

After execution of the block 762, the exhaust temperature control or tracking action is determined in a series of blocks similar to those just considered in connection with blade path temperature control and tracking action. Further, a save variable block 769 provides for storing the exhaust temperature error and the track function output initiated by block 769. After the exhaust temperature output limit is determined in block 766, a return is made to the routine 712 in FIG. 20. Next, a software low selection is made by block 700 in Mode 1 control program execution.

Once synchronous speed is reached, block 768 in FIG. 20 directs the program into Mode 2 control operations. In block 770, the speed reference is set equal to the top speed value plus any speed change entered into the control loop by manual synchronization operations or by automatic synchronization program execution. Further, the program operations are redirected through blocks 726, 728, 744 and 700 as in the case of Mode 1 control.

After synchronization, block 772 or 744 directs control program operations to a Mode 3 control block 776 or a Mode 4 control block 778, according to the operator's panel selection. Mode 2 control provides for determining kilowatt error from the difference between a kilowatt reference and actual kilowatts. Proportional and integral control routines are then applied to the kilowatt error and the resultant controller outputs are summed in order to provide for constant kilowatt control with temperature limit backup. Further, a loading rate limit is imposed to prevent excessive thermal transients due to excessive loading rates under automatic or manual incremental loading. A discussion of the loading limit subroutine and its operation in Modes 1, 2 and 3 may be found at page 194 of copending application Ser. No. 82,470.

Initially, in Mode 3 operation, the kilowatt reference is set at a minimum value pending operator selection of a reference value at which may not exceed a value corresponding to the base load exhaust temperature limit.

Thus, the primary Mode 3 controls are the exhaust temperature control and the constant kilowatt control, with blade path and surge controls providing backup protection.

Mode 4 control differs from Mode 3 control in that no constant kilowatt function is provided for Mode 4. However, a loading rate limit is imposed. A temperature reference is determined for use in the blade path and exhaust temperature limit control block 744.

In both Mode 3 and Mode 4, the block 744 is executed in a manner considered previously in connection with Mode 1. Since no constant kilowatt function is provided for mode 4, the block 744 provides for a temperature loading operation through exhaust temperature limit action. Under temperature control, the generated power varies with the ambient error temperature such that more power is generated with lower inlet air temperature.

Load Mode 3 and load Mode 4 program executions are completed through low select block 700 which selects the lowest fuel demand representation associated with the temperature, surge and load limits to provide the control operation as described. Control program execution through the block 766 and/or 788, 744 and 700 continues for the duration of Mode 3 or Mode 4 load control.

Figure 28:
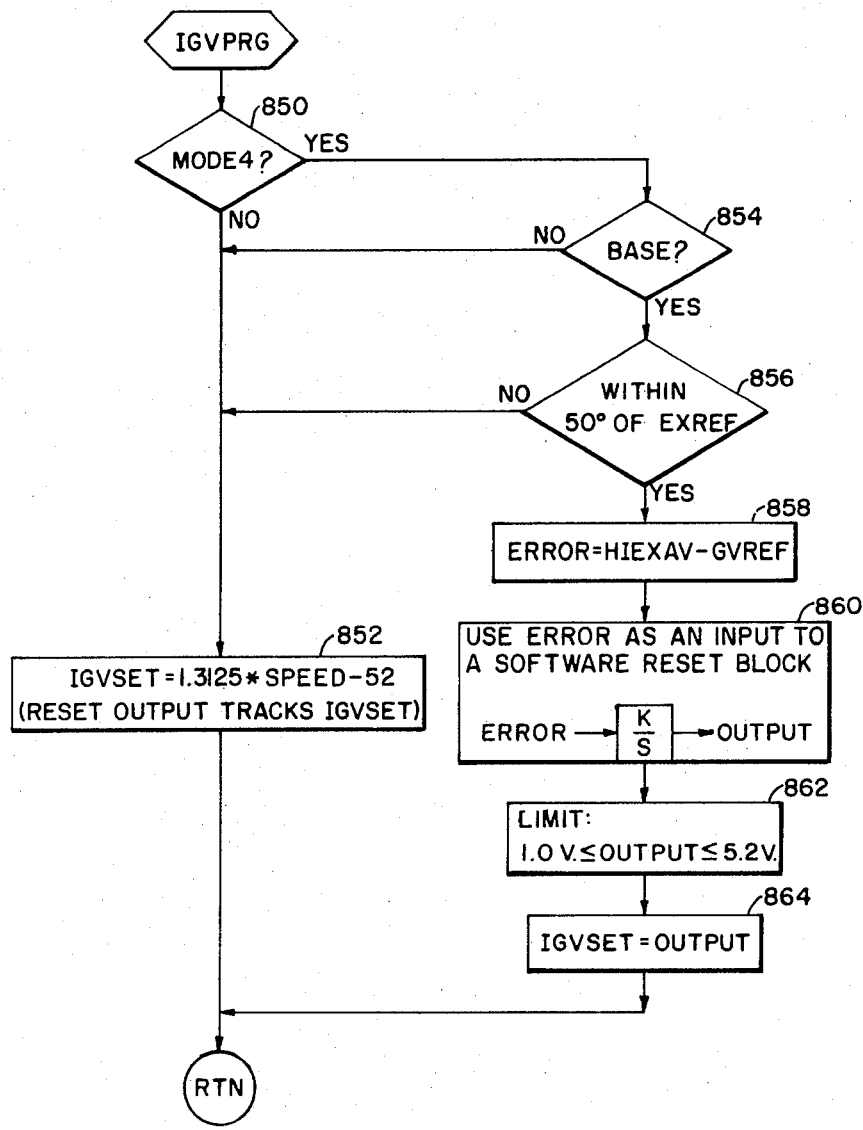
FIG. 28 shows a flowchart for the inlet guide vane control function in accordance with the principles of the present invention.

Turning now to the consideration of an improved gas turbine control loop implementation operative within the control framework hereinabove described, FIG. 28 illustrates in logic flow form a computer implementation of control function shared among the normal control modes of operation in accordance with one aspect of the present invention, as well as the dual turbine application control functions implemented in accordance with another aspect of the present invention. As discussed previously inlet guide vane control signals are developed in an alternative manner over different modes of operation of industrial gas turbine 104. Variations in parametric controls over different operation cycles in this manner provides the flexibility required in the dual application control system previously discussed.

As shown in FIG. 28, the guide vane control program IGVPRG is operative in all modes of gas turbine operations (exclusive of sequencing Mode 0). A mode 4 "true" test is executed in block 850 upon each entry into the inlet guide vane control program. In control modes 1, 2 and 3, control is directed to block 852, where the inlet guide vane positioning control variable, IGVSET, is computed as a function of an output from the main speed channel 327 SPEED.

Figure 29:
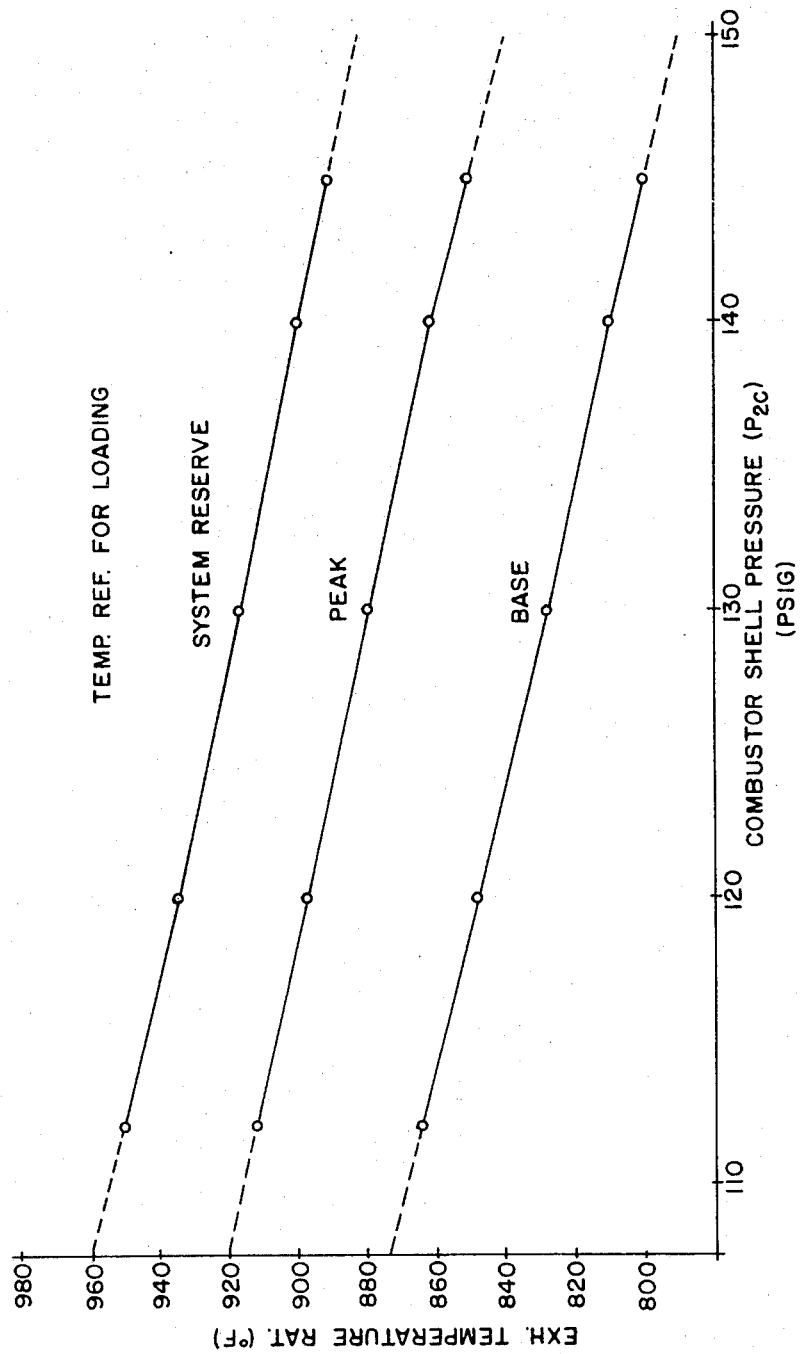
FIG. 29 illustrates various curve data employed in the control system computer in the operation of the gas turbine power plant.

After the gas turbine 104 attains top or synchronous speed, control is transferred to Mode 4. Thereafter, upon entry into control program IGVPRG, the mode 4 "true" performed in block 852 will cause a branch to block 854. Mode 4, a temperature control mode, schedules turbine operation as a function of exhaust gas temperature. Control of the exhaust temperature is maintained consistent with one of the three operating lines shown in FIG. 29, i.e., base, peak or system reserve. The exhaust temperature loop maintains operation consistent with one of the three illustrated characterizations in the normal modes of turbine control hereinabove discussed.

Figure 30B:
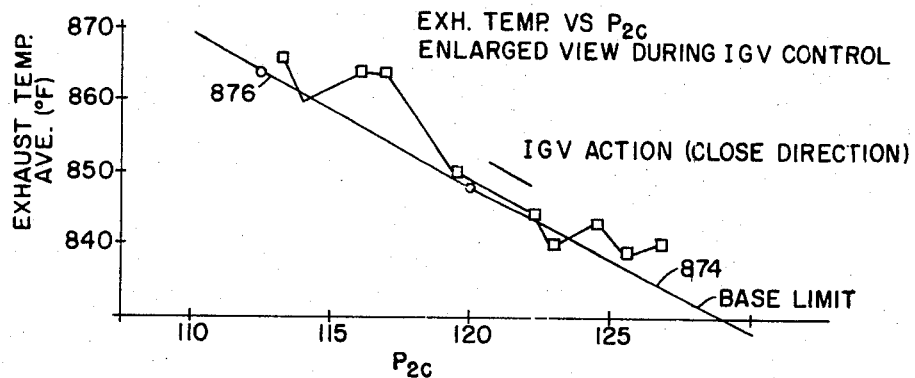
FIGS. 30A-B illustrate various curve data employed in the control system computer in Mode 4 control status with and without repositioning the variable guide vanes.
Figure 30A:
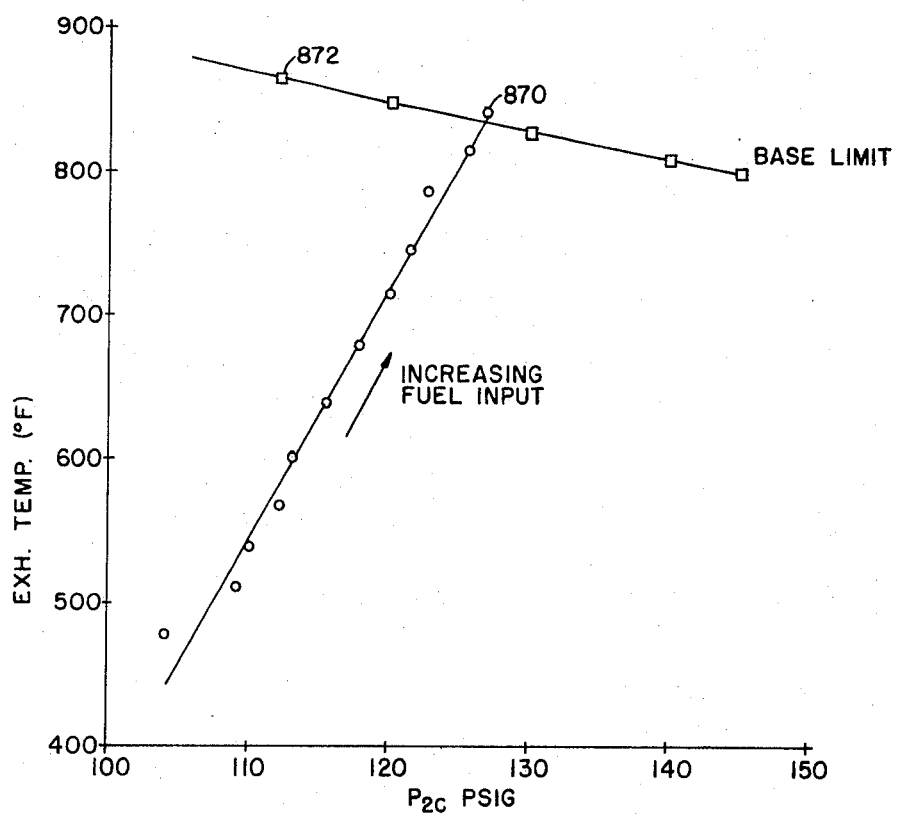

Turning now to the consideration of FIGS. 30A and 30B, we have first to consider the inter-relation of the various parameters to be considered in achieving the flexible control in the improved control loop of the present invention. Depicted in FIG. 30A is the base limit line of FIG. 29. The intersecting line is a plot of exhaust temperatures versus combustor shell pressures for a given ambient temperature. The particular ambient temperature shown is 63°F. Point 870, the point of intersection, defines the kilowatt output obtainable at the optimum turbine exhaust temperature operating point for the given ambient temperature. Increased ambient temperature would cause a translation of the intersecting line to the left which would move the point of intersection with the base line to a higher exhaust temperature operating point. By reference to the horizontal scale, combustor shell pressure, we see that such translation would yield a set of lower combustor shell pressure readings. This indicates that less dense air is entering the compressor at a higher ambient temperature. Movement upward and to the left on the base limit line yields a lower generator output. Summarizing, for a higher ambient temperature, the point of intersection with the base load operating limit line occurs at a higher exhaust temperature and a lower kilowatt output.

In accordance with the principles of the present invention, constant exhaust temperature control is achieved as a function of combustor shell pressure in a manner which reduces slightly the power output by manipulating the guide vanes so that exhaust temperature is put under guide vane control rather than ambient temperature control as depicted in FIG. 30A. Point 872 on the base limit lines corresponds to 864°F which, in this example, has been determined as the optimum exhaust temperature for discharged gases. Referring to FIG. 30B, a plot of points between 874 and 876 depicts the exhaust temperature response to manipulations of the inlet guide vanes as they are moved from their fully open position, or 3°, to their fully closed position, or 40°.

Summarizing, referring to FIGS. 30A and 30B conjunctively, we see that under normal turbine control the turbine will load to point 870 on a 63°F day; however point 872 is the desired average exhaust temperature. The inlet guide vane control will recognize the error between the two values and will slowly close the inlet guide vanes, thus decreasing combustor shell pressure, $P_2C$. The temperature control loop which reacts much faster than the inlet guide vane control will sense the drop in $P_2C$ and will schedule more fuel into the turbine to bring the unit to the new allowable operating temperature. This action continues until the desired exhaust temperature average represented by points 872 and 876 is reached. At such desired exhaust temperature operating point, movement of the inlet guidevanes ceases the temperature stabilizes at the desired value. As hereinbefore discussed, in connection with FIG. 13A, the inlet guide vanes are normally controlled by the computer as a function of speed; however, when the unit is on base load control in operating Mode 4, and within 50°F of the normal control mode reference point, that is, as at 870 or 874, the improved inlet guide vane control of the present invention is activated.

The temperature error between the desired and actual temperatures comprises an input into a reset function whose output controls the inlet guidevane position. A discussion of plant performance characteristics appears at page 32 of the aforementioned copending application Ser. No. 82,470 in connection with FIGS.

11A-G of such application which illustrate various performance curves associated with the turbine-generator unit.

Turning now to a further consideration of the logic flowchart of FIG. 28, the control scheme discussed above comes into effect if the decision logic in block 854 determines that turbine operation is along the base load line. If not, a branch is executed so that inlet guide vane control continues as a function of speed as shown in block 852. If the turbine is operating along the base load line, a further test is performed by block 856 to determine if temperature ramping has occurred to within 50°F of the reference temperature. Again, a branch is executed to block 852 if not within 50° of the temperature reference, so that the guide vanes continue to be positioned as a function of speed.

The alternative control mode commences operation in block 858 as temperature ramping brings the turbine exhaust temperature to within 50° of reference temperature. In block 858, the error variable is set equal to the high exhaust average minus the reference temperature. The error variable is used as an input to a slow integrating function so that, if the exhaust average is lower than the reference temperature, the guide vanes will be displaced towards the closed position. If the exhaust average reaches a point above the guidevane reference, the inlet guide vanes will be further opened. This causes the slight oscillations depicted in FIG. 30B. As the guide vanes are gradually closed, the pressure $P_2C$ decreases because of the decreased flow of air through the turbine. As the pressure decreases, the exhaust temperature reference generated by a function generator in the control program moves upward and control of the guide vanes continues until a stable operating point is reached, as at 872 and 876.

A further feature is the output tracking performed in block 852. Such tracking permits ready transfer over to flow reset or integrator control of the inlet guide vane positioning in accordance with the principles of the present invention.

A variety of special control program macros and subroutines are employed in the preferred implementation of the control program 602. A discussion of such may be found in Section D8 of the aforementioned copending application Ser. No. 80,467, pages 198 to 203.

9. Alarm and Thermocouple Check Programs

In the alarm system, alarms are generated in response to sensors considered in connection with FIG. 9. Printout of alarms is made as in the following example:

| Time | Status | Turbine Identification | Description |
|---|---|---|---|
| 12:30 | ALRM | A | Flame A |

The status conditions of the alarms are listed below:
NORM — Normal
Alarm — Alarm Alarms are determined by the sequencing program 600 and the thermocouple check program 616 as previously considered. The alarm program 610 is periodically executed to print out all points in alarm. Multiple confusing alarm lightings as encountered with conventional annunciator panels are thus avoided.

The thermocouple check program 616 also runs on a periodic basis. When it is executed, a check is made of the values stored for all thermocouples not checked by the control program 602 to determine if the thermocouple value is more negative than a predetermined check number stored in location CHKNO. An excessive negative number is considered an open circuit and an alarm bit is set for the alarm program 610.

10. Data Logging Program

A formated log is printed in response to execution of the log program 618 on a periodic basis selected by the plant operator within the range of 15 minutes to 2 hours. The printed readings are instantaneous values obtained from the last analog scan cycle. The plant operator may select any 20 analog points per turbine under control.

Generally, the analog conversion program 620 provides for converting entered analog values into the engineering value represented by the input and vice versa. Generally, four types of conversion are provided, i.e., flow straightline, thermocouple, and segmented straight-line.

11. Miscellaneous Programs

The miscellaneous programs 622 include a programmer's console function program, a dead switch computer program, a power failure and restart program, and a horn and alarm lamp program. Additional programmer's console functions designated herein as being implemented by miscellaneous programs rather than the executive program include a CCI print status program, an analog engineering units print program, a contact output operate program, a test dead computer system program and a time program.

The alarm and thermocouple check programs, data logging program, and miscellaneous programs are more fully discussed in the aforementioned copending application Ser. No. 82,470, Section D9 to Section D11, pages 204 to 210.

The program system described in Section D herein substantially embraces that described in the corresponding section of application Ser. No. 82,470. Contained herein is the description of a preferred embodiment of an increment thereto giving rise to an enhanced monitoring and control capability.

Here again, the detailed flowchart corresponding to the inlet guide vane control program printout does have certain differences from certain aspects of the described flowchart. The list of programs do provide for an essential implementation of the subject matter described herein.

Most developed system software may be characterized with relatively minor faults known as bugs which sometimes take long periods of time to detect and/or diagnose. Orginarily the correction of such faults is within the skill of control and system programmers. The program listing which follows accordingly may be expected to contain some faults of this kind but all such faults which have been detected have required only programmer's skill for correcton in field applications.

```
                                    ****  251 -AA OPTION  ****
                                    INLET GUIDE VANE CONTROL OF EXH. TEMPERATURE
           33450         8ORG 33450

********  CAUTION  ********
                                    THIS ORIGIN IS GOOD ONLY FOR A 1 UNIT SYSTEM
                                    IN THAT THE IGV PROGRAM IS-ORIGINED IN THE
                                    B UNIT RESIDENT CONTROL TABLE

00001    TRUE   EQU 1
           00000    FALSE  EQU 0
           00000    XX     EQU 0        DUMMY SYMBOL.  VALUE FILLED AT RUN TIME

00202    MULTPY8EQU 202      EXEC MULTIPLY ROUTINE
           32400    UPPER 8EQU 32400    DOUBLE PREC. LOCATIONS
           32401    LOWER 8EQU UPPER+1  DOUBLE PREC. LOCATIONS
           31017    CTLJPI8EQU 31017    POINT IN CTRL PROG WHERE WE JUMP TO IGV CONTROL

30472    SGSGNL8EQU 30472

30405    MODE4 8EQU 30405
           30407    BASE  8EQU MODE4+2
           30423    HIEXAV EQU MODE4+14  ADC/I  EXHAUST TEMPERATURE AVERAGE
           30425    EXREF  EQU MODE4+16  ADC/2  EXHAUST TEMPERATURE REFERENCE
           30404    MODE3  EQU MODE4-1

24673    ACSPED8EQU 24673    INPUT VALUE ADDRESS FOR THE ACTUAL TURB. SPEED

32556    LIMIT 8EQU 32556    IGT. MAX LIMIT

32402    INTGR 8EQU 32402    INTEGRATOR ROUTINE 00104    50DEG 8EQU 104      ADC/2 FOR 50 DEGREES IN 800 DEG.-RANGE

30653    TNUMBR8EQU 30653

30436    LOWEST8EQU 30436

IFF   MAC VAR,COND,LABEL,A
                          DLE -VAR/VAR+1*1
                          RSH VAR,A
                          DLE COND*1
                          PJP LABEL
                          DLE 1-COND*2
                          PJP L+2
                          JMP LABEL
                          TER

FIL   MAC NAME,VALA,VALB
                          OCT VALA    NAME UNIT B
                          OCT VALA    NAME UNIT A
                    NAME  SYN L-1
                          REM
                          TER
                          EJE

STORAGE FOR IGV ROUTINE

INLET GUIDE VANE SETTINGS CALCULATED FOR THE
                                    UNITS.  THESE ARE STORED HERE FOR LATER OUTPUT
                                    BY THE AO PROG.
  33450    00000    IGSETB OCT
  33451    00000    IGSETA OCT

X X X X X X X X X X X X X X X X X X X X X X X

33452    GVTREF SYN L         ADC/2   GUIDE VANE CONTROL TEMPERATURE SETPOINT
  33452    01771           OCT 1771  849 DEG F (ADC/2)

X X X X X X X X X X X X X X X X X X X X X X X 33453    00000    GVTERR OCT           TEMPERATURE ERROR IN THE GV CONLROL LOOP
```

```
130    33454        00000    LASERB OCT XX          LAST ERROR VALUE UNIT B
131    33455        00000    LASERA OCT XX          LAST ERROR VALUE UNIT A
132
133
134                 33456    GVGAIN SYN L           GAIN OF RESET BLOCK
135    33456        01000           OCT 1000
136
137
140    33457        00000    IGVTM1 OCT             TEMPORARY STORAGES
141    33460        00000    IGVTM2 OCT
142
143
144    33461        00051    PT01   DEC .01812
145                                 EJE
146                                                 THIS BLOCK OF PROGRAMMING IS FOR INLET GUIDE
147                                                 VANE CONTROL. THE VANES ARE CONTROLLED
150                                                 EITHER AS A FUNCTION OF SPEED-OR THEY ARE
151                                                 CONTROLLED TO ACHIEVE A DESIRED TEMPERATURE
152
153
154                 33462    IGVPRG SYN L
155                                                 FIRST DO THE INSTRUCTIONS USED IN CTRL TO GET
156                                                 HERE
157    33462  37 1 172 .            STL SGSGNL
160    33463  37 1 171 .            STL LOWEST
161
162
163                                                 CALCULATE AND STORE OUTPUT ADDRESS
164    33464  32 0 170 .            ENL IGSETA)
165    33465  11 1 167 .            SUB TNUMBR
166    33466  37 0 136             STL IGVSET
167
170
171                                                 FOLLOWING IS A SMALL PREPROCESSOR TO CALC
172                                                 THE ADDR OF THE PREVIOUS RESET INPUT
173    33467  32 0 166 .            ENL LASERA)
174    33470  11 1 167             SUB TNUMBR
175    33471  37 0 134             STL LASERR
176
177
200                                 IFF MODE4,TRUE,M4SPCL
                                    DLE -MODE4/MODE4+1*1
       33472  16 1 165 .            RSH MODE4,
                                    DLE TRUE*1
                                    DLE 1-TRUE*2
       33473  27 0 074              PJP L+2
       33474  24 0 114              JMP M4SPCL
201                 33475    SPDSET SYN L
202                                                 NOT IN MODE4 DO REGULAR CONTROL AS A FUNCTION
203                                                 OF SPEED
204
205                                                     IGV = (1.3)*SPEED - .01812
206
207
210
211    33475  32 0 164 .            ENL ACSPED)
212    33476  11 1 167             SUB TNUMBR
213    33477  37 0 057             STL IGVTM1
214    33500  32 1 057             ENL IGVTM1,I
215                                                 NOW HAVE AL=SPEED
216    33501  16 1 163 .            RSH ACC
217    33502  16 1 163              RSH ACC
220                                                 AL=.25*SPEED
221    33503  37 0 060             STL IGVTM2
222
223    33504  16 1 163             RSH ACC
224    33505  16 1 163             RSH ACC
225                                                 AL=.0625*SPEED
226    33506  10 0 060             ADD IGVTM2
227    33507  10 1 057             ADD IGVTM1,I
230                                                 AL= 1.3125*SPEED
231    33510  11 0 061             SUB PT01
232    33511  37 1 136             STL IGVSET,I
233
234                                                 AL= 1.3125*SPEED - .01812
235
236                                                 SAVE A ZERO VALUE FOR PREVIOUS RESET INPUT
237    33512  32 0 162 .            ENL 0)
240    33513  37 1 134             STL LASERR,I
241
242
243    33514  24 0 147             JMP ENDIGV
244                                                 THIS IS THE END OF THE SIMPLE SPEED CONTROL
245                                                 OF THE GUIDE VANES
```

```
246                             EJE
247             33515  M4SPCL SYN L         SPECIAL GUIDE VANE LOGIC FOR IGV CONTROL OF
250                                         THE EXHAUST TEMPERATURE.
251
252                                         ONLY DO THIS LOGIC WHEN ON BASE CONTROL AND
253                                         WHEN THE EXH. TEMP IS WITHIN 50 DEG. OF THE REF.
254                            IFF BASE,FALSE,SPDSET
                               DLE -BASE/BASE+1*1
       33515 16 1 161   .      RSH BASE,
                               DLE FALSE*1
       33516 27 0 074          PJP SPDSET
                               DLE 1-FALSE*2
255
256    33517 32 1 160   .      ENL EXREF        ADC/2
257    33520 11 0 157   .      SUB 50DEG)       ADC/2
260    33521 11 1 156   .      SUB HIEXAV       ADC/2
261    33522 27 0 074          PJP SPDSET
262                                         IF NOT WITHIN 50 DEG OF EXH TEMP CONTROL PT
263                                         DO NOT PROCESS THE FOLLOWING
264
265    33523 32 1 156          ENL HIEXAV       ADC/2
266    33524 11 0 052          SUB GVTREF       ADC/2
267                                         IN THIS CASE THE ERROR IS REVERSED BECAUSE
270                                         WHEN THE ACTUAL TEMPERATURE IS HIGHER
271                                         THAN THE REFERENCE WE WANT TO INCREASE THE
272                                         SIGNAL TO THE GUIDE VANES AND OPEN THEM MORE TO
273                                         LOWER THE TEMPERATURE
274    33525 37 0 053          STL GVTERR      ADC/2
275
276
277    33526 32 1 155   .      ENL LIMIT       SAVE FOR LATER RESTORE
300    33527 37 0 057          STL IGVTM1
301
302    33530 32 0 154   .     8ENL 10400)      5+ VOLT MAX.
303    33531 37 1 155          STL LIMIT
304                                         SET NEW LIMIT FOR IGV RESET BLOCK
305    33532 32 0 056          ENL GVGAIN      RESET BLOCK
306    33533 36 1 153   .      RJP INTGR
307    33534 00000     LASERR OCT XX          PREVIOUS INPUT (CALCULATED)
310    33535 33453             OCT GVTERR
311    33536 00000     IGVSET OCT XX          ADDRESS OF SETTING BEING CALCULATED
312
313
314                                         NOW CHECK AGAINST MIN VALUE
315
316    33537 11 0 152   .      SUB 819)       1 VOLT MIN.
317    33540 27 0 142          PJP ABVMIN
320    33541 32 0 152          ENL 819)
321    33542 37 1 136          STL IGVSET,I
322
323          33543     ABVMIN SYN L
324    33543 32 0 057          ENL IGVTM1
325    33544 37 1 155          STL LIMIT
326                                         SAVE PRESENT INPUT FOR NEXT TIME
327    33545 32 0 053          ENL GVTERR
330    33546 37 1 134          STL LASERR,I
331    33547 24 0 147          JMP ENDIGV
332          33550     ENDIGV SYN L
333    33550 24 1 151   .      JMP CTLJP1+2
       33551 31020             WRD
       33552 01463             WRD
       33553 32402             WRD
       33554 10400             WRD
       33555 32556             WRD
       33556 30423             WRD
       33557 00104             WRD
       33560 30425             WRD
       33561 30407             WRD
       33562 00000             WRD
       33563 00101             WRD
       33564 24673             WRD
       33565 30405             WRD
       33566 33455             WRD
       33567 30653             WRD
       33570 33451             WRD
       33571 30436             WRD
       33572 30472             WRD
334          27433            8ORG 27433
335
336
337                                         THE FOLLOWING INSTRUCTIONS MODIFY THE ADDRESS
340                                         OF THE VARIABLE VALUES TO BE OUT UT BY THE
341                                         FORMER INCOMING VOLTMETER ANALOG OUTPUT.
342                                         THE VALUES OUTPUT ARE NOW THE INLET GUIDE VANE
343                                         POSITIONING SIGNAL.
344
```

```
345    27433    33450            OCT  IGSETB
346    27434    33451            OCT  IGSETA
347             31017            8ORG CTLJP1
350
351                                              REPLACE INSTRUCTIONS IN CONTROL PROGRAM WITH
352                                              JUMP TO THE INLET GUIDE VANE CONTROL LOGIC.
353
354    31017    24 1 020         JMP  L+1,I
355    31020       33461         OCT  IGVPRG-1
356
357                00000         END
```

What is claimed is:

1. A gas turbine electric power plant comprising a gas turbine having compressor and combustion and turbine elements, a generator having a field winding and being coupled to said gas turbine for drive power, a fuel system for supplying fuel for said gas turbine combustion elements, means for exciting said generator field winding, a control system including a digital computer and an input/output system therefor, a plurality of sensors disposed to monitor selected turbine parameters and to provide control system inputs representative thereof, means for operating said fuel system to energize said turbine and for controlling said exciting means, means continuously responsive to a control system output for modulating air flow into said compressor, and means for operating said computer to make functionally independent control action determinations for implementation by said fuel system operating means, said exciting means and said air flow modulating means, said modulating means and said fuel system control actions being determined as some function of time varying combinations of control parameters whose values are determined in response to said sensor inputs.

2. An electric power plant as set forth in claim 1 wherein said computer operating means further operates to determine control actions for implementation by said air flow modulating means to maintain gas turbine operation at a constant exhaust temperature over at least one interval of gas turbine operation.

3. An electric power plant as set forth in claim 2 wherein said plurality of sensors comprises at least an arrangement of sensors disposed to detect pressures on said combustion elements and wherein control actions for implementation by said air flow modulating means are at least partially determined over at least one time interval as a function of control parameters whose values are determined in response to inputs from said arrangement.

4. An electric power plant as set forth in claim 2 wherein said plurality of sensors comprises at least a first arrangement of sensors disposed to detect pressures on said combustion elements and a second arrangement of sensors disposed to detect temperatures at the exhaust cycle position of said turbine elements and wherein said control actions for implementation by said air flow modulating means are at least partially determined over at least one time interval as a function of control parameters whose values are determined in response to a combination of inputs from said first and second arrangements.

5. An electric power plant as set forth in claim 2 wherein said plurality of sensors comprises at least one turbine speed sensor and wherein control actions for implementation by said air flow modulating means are at least partially determined over at least one time interval as a function of control parameters whose values are determined in response to inputs from said speed sensor.

6. An electric power plant as set forth in claim 2 wherein said plurality of sensors comprises at least a first arrangement of sensors disposed to detect compressor inlet temperatures and a second arrangement of sensors disposed to detect exhaust gas temperatures and wherein said control actions for implementation by said air flow modulating means are at least partially determined over at least one time interval as a function of control parameters whose values are determined in response to inputs from the combination of said first arrangement and said second arrangement.

7. An electric power plant as set forth in claim 2 wherein said plurality of sensors comprises at least a first arrangement of sensors disposed to detect pressures on said combustion elements and a second arrangement of sensors disposed to detect turbine exhaust temperatures and wherein said control actions for implementation by said air flow modulating means are at least partially determined over at least one time interval as a function of control parameters whose values are determined in response to inputs from a combination of said first and said second arrangements.

8. An electric power plant as set forth in claim 2 wherein said plurality of sensors comprises at least a first sensor disposed to detect turbine speed, a first arrangement of sensors disposed to detect pressures on said combustion elements and a second arrangement disposed to detect temperatures of exhaust gases and wherein control actions for implementation by said air flow modulating means are at least partially determined over at least one time interval as a function of control parameters whose values are determined in response to said speed sensor and at least partially determined over at least another time interval as a function of control parameters whose values are determined in response to inputs from a combination of said first and second arrangements.

9. An electric power plant as set forth in claim 8 wherein control actions for implementation by said air flow modulating means are at least partially determined over an earlier time interval as a function of control parameters whose values are determined in response to inputs from said speed sensor and at least partially determined over a later time interval as a function of control parameters whose values are determined in response to inputs from the combination of said first and said second arrangements.

10. An electric power plant as set forth in claim 2 wherein said air flow modulating means comprises a plurality of compressor variable inlet guide vanes, a positioning ring mechanically coupled to said guide vanes, and control means for rotating said positioning ring to open and close said guide vanes.

11. An electric power plant as set forth in claim 8 wherein said air flow modulating means comprises a plurality of compressor variable inlet guide vanes, a positioning ring mechanically coupled to said guide vanes, and control means for rotating said positioning ring to open and close said guide vanes.

12. An electric power plant as set forth in claim 1 wherein means are provided for detecting generator load and said computer operating means further provides for controlling said fuel system operating means in response to detected load to regulate the generator load substantially to a predetermined value.

13. An electric power plant as set forth in claim 2 wherein means are provided for detecting generator load and said computer operating means further provides for controlling said fuel system operating means in response to detected generator load to regulate the generator load substantially to a predetermined value.

14. An electric power plant as set forth in claim 13 wherein said computer operating means operates to regulate said generator substantially to a predetermined value as a function of exhaust temperature.

15. An electric power plant as set forth in claim 14 wherein said plurality of sensors comprises at least an arrangement of sensors disposed to detect pressures on said combustion elements and wherein control actions for implementation by said air flow modulating means are at least partially determined in response to inputs from said arrangement.

16. An electric power plant as set forth in claim 14 wherein said plurality of sensors comprises at least an arrangement of sensors disposed to detect temperatures at the exhaust cycle position of said turbine element and wherein said control actions for implementation by said air flow modulating means is at least partially determined over at least one time interval as a function of control parameters whose values are determined in response to inputs from said arrangement.

17. An electric power plant as set forth in claim 14 wherein said plurality of sensors comprises at least a first arrangement of sensors disposed to detect pressure on said combustion element and a second arrangement of sensors disposed to detect temperatures at the exhaust gas cycle position of said turbine element and wherein said control actions for implementation by said air flow modulating means are at least partially determined over at least one time interval as a function of control parameters whose values are determined in response to a combination of inputs from said first and second arrangements.

18. A method of operating a digital control computer associated with a gas turbine electric power plant interfaced with an industrial process including an electric generator and a gas turbine having compressor, combustion and turbine elements, air flow modulating means at the intake of said compressor and a fuel system for supplying fuel to the combustion element, the steps of said method comprising determining an acquired representation of actual generator load, determining an exhaust heat temperature requirement for said industrial process, determining a fuel requirement consistent with said exhaust heat temperature requirement, scheduling fuel to provide for turbine operation at said temperature, and regulating said generator load consistent with maintaining said temperature.

19. A method as recited in claim 18 wherein said scheduling step further comprises manipulating said air flow modulating means to alter fuel requirements consistent with maintaining a constant exhaust temperature.

* * * * *